US012592134B2

(12) United States Patent
Patel

(10) Patent No.: US 12,592,134 B2
(45) Date of Patent: Mar. 31, 2026

(54) SYSTEMS AND METHODS FOR TOOL ACTIVATION AND DISPLAY CABINET LOCKING

(71) Applicant: PAYRANGE INC., Portland, OR (US)

(72) Inventor: Paresh K. Patel, Portland, OR (US)

(73) Assignee: PayRange LLC, Portland, OR (US)

( * ) Notice: Subject to any disclaimer, the term of this patent is extended or adjusted under 35 U.S.C. 154(b) by 0 days.

(21) Appl. No.: 19/019,278

(22) Filed: Jan. 13, 2025

(65) Prior Publication Data

US 2025/0148891 A1 May 8, 2025

Related U.S. Application Data

(63) Continuation-in-part of application No. 18/610,033, filed on Mar. 19, 2024, which is a continuation of
(Continued)

(51) Int. Cl.
*G08B 13/24* (2006.01)
*G06Q 20/32* (2012.01)
(Continued)

(52) U.S. Cl.
CPC ......... *G08B 13/2462* (2013.01); *G06Q 20/32* (2013.01); *G06Q 20/327* (2013.01);
(Continued)

(58) Field of Classification Search
CPC .. G08B 13/2462; G06Q 20/32; G06Q 20/327; G06Q 20/3278; G06Q 20/36;
(Continued)

(56) References Cited

U.S. PATENT DOCUMENTS

| | | | |
|---|---|---|---|
| 309,219 A | 12/1884 | Brenzel | |
| 3,457,391 A | 7/1969 | Yamamoto | |
| (Continued) | | | |

FOREIGN PATENT DOCUMENTS

| | | | |
|---|---|---|---|
| AU | 2010306907 A1 | 9/2012 | |
| AU | 2021107597 A4 | 1/2022 | |
| (Continued) | | | |

OTHER PUBLICATIONS

US 12,125,030 B2, 10/2024, Patel (withdrawn)
(Continued)

*Primary Examiner* — Michael Collins
(74) *Attorney, Agent, or Firm* — Morgan, Lewis & Bockius LLP

(57) ABSTRACT

Disclosed are systems and methods for tool activation and display cabinet locking. In one aspect, a method for activating a product is performed at the product. The product includes a power supply, a controller, a persistent memory coupled to the controller, and a radio module. The product is configured to be operable in a plurality of states, and a state of the product is in an inactivated state. The method includes receiving via the radio module an activation message and an authorization token. The method includes attempting to validate the authorization token based on a preset authorization information and the state of the product. The method includes, (i) when the validation is not successful, rejecting the activation message without changing the state of the product; and (ii) when the validation is successful, changing the state of the product from the inactivated state to an activated state.

17 Claims, 17 Drawing Sheets

Related U.S. Application Data application No. 17/443,802, filed on Jul. 27, 2021, now Pat. No. 11,935,051, which is a continuation of application No. 16/934,933, filed on Jul. 21, 2020, now Pat. No. 11,074,580.

(60) Provisional application No. 63/620,674, filed on Jan. 12, 2024.

(51) Int. Cl.

| | |
|---|---|
| *G06Q 20/36* | (2012.01) |
| *G06Q 20/38* | (2012.01) |
| *G06Q 20/40* | (2012.01) |
| *G06Q 30/06* | (2023.01) |
| *G07F 9/00* | (2006.01) |
| *G07F 9/02* | (2006.01) |

(52) U.S. Cl.
CPC ......... *G06Q 20/3278* (2013.01); *G06Q 20/36* (2013.01); *G06Q 20/38* (2013.01); *G06Q 20/3821* (2013.01); *G06Q 20/3823* (2013.01); *G06Q 20/3829* (2013.01); *G06Q 20/40* (2013.01); *G06Q 20/401* (2013.01); *G06Q 20/405* (2013.01); *G06Q 30/06* (2013.01); *G07F 9/002* (2020.05); *G07F 9/023* (2013.01); *G06Q 2220/00* (2013.01)

(58) Field of Classification Search
CPC .............. G06Q 20/38; G06Q 20/3821; G06Q 20/3823; G06Q 20/3829; G06Q 20/40; G06Q 20/401; G06Q 20/405; G06Q 30/06; G06Q 2220/00; G07F 9/002; G07F 9/023
See application file for complete search history.

(56) References Cited

U.S. PATENT DOCUMENTS

| | | | |
|---|---|---|---|
| 3,931,497 | A | 1/1976 | Gentile et al. |
| 4,374,557 | A | 2/1983 | Sugimoto et al. |
| 4,778,983 | A | 10/1988 | Ushikubo |
| 5,479,602 | A | 12/1995 | Baecker et al. |
| 5,734,150 | A | 3/1998 | Brown et al. |
| 5,844,808 | A | 12/1998 | Konsmo et al. |
| 5,854,994 | A | 12/1998 | Canada et al. |
| 5,880,733 | A | 3/1999 | Horvitz et al. |
| 5,892,900 | A | 4/1999 | Ginter et al. |
| 5,955,718 | A | 9/1999 | Levasseur |
| 6,056,194 | A | 5/2000 | Kolls |
| 6,332,127 | B1 | 12/2001 | Bandera et al. |
| 6,390,269 | B1 | 5/2002 | Billington |
| 6,462,644 | B1 | 10/2002 | Howell |
| 6,505,095 | B1 | 1/2003 | Kolls |
| 6,584,309 | B1 | 6/2003 | Whigham |
| 6,594,759 | B1 | 7/2003 | Wang |
| 6,743,095 | B2 | 6/2004 | Cole et al. |
| 6,793,134 | B2 | 9/2004 | Clark |
| 6,810,234 | B1 | 10/2004 | Rasanen |
| 6,840,860 | B1 | 1/2005 | Okuniewicz |
| 7,085,556 | B2 | 8/2006 | Offer |
| 7,110,954 | B2 | 9/2006 | Yung et al. |
| 7,127,236 | B2 | 10/2006 | Khan et al. |
| 7,131,575 | B1 | 11/2006 | Kolls |
| 7,455,223 | B1 | 11/2008 | Wilson |
| 7,458,510 | B1 | 12/2008 | Zhou |
| 7,464,867 | B1 | 12/2008 | Kolls |
| 7,493,288 | B2 | 2/2009 | Biship et al. |
| 7,513,419 | B1 | 4/2009 | Crews et al. |
| 7,672,680 | B1 | 3/2010 | Lee et al. |
| 7,690,495 | B1 | 4/2010 | Kolls |
| 7,721,958 | B2 | 5/2010 | Belfer et al. |
| 7,848,980 | B2 | 12/2010 | Carlson |
| 7,866,544 | B1 | 1/2011 | Block et al. |

| | | | |
|---|---|---|---|
| 7,962,369 | B2 | 6/2011 | Rosenberg |
| 7,965,693 | B2 | 6/2011 | Jiang et al. |
| 7,983,670 | B1 | 7/2011 | Elliott |
| 8,020,763 | B1 | 9/2011 | Kowalchyk |
| 8,059,101 | B2 | 11/2011 | Westerman |
| 8,157,167 | B2 | 4/2012 | Cost et al. |
| 8,201,736 | B2 | 6/2012 | Majer |
| 8,255,323 | B1 | 8/2012 | Casey et al. |
| D669,899 | S | 10/2012 | Cheng et al. |
| 8,346,670 | B2 | 1/2013 | Hasson et al. |
| 8,356,754 | B2 | 1/2013 | Johnson et al. |
| 8,376,227 | B2 | 2/2013 | Hammad et al. |
| 8,396,589 | B2 | 3/2013 | Katzenstein Garibaldi |
| 8,412,626 | B2 | 4/2013 | Hirson et al. |
| 8,438,066 | B1 | 5/2013 | Yuen |
| 8,479,190 | B2 | 7/2013 | Sueyoshi et al. |
| 8,489,140 | B2 | 7/2013 | Weiner et al. |
| 8,496,168 | B1 | 7/2013 | Miller et al. |
| 8,514,775 | B2 | 8/2013 | Frecassetti et al. |
| 8,517,766 | B2 | 8/2013 | Golko et al. |
| 8,548,426 | B2 | 10/2013 | Smith |
| 8,577,734 | B2 | 11/2013 | Treyz |
| 8,583,496 | B2 | 11/2013 | You et al. |
| 8,596,528 | B2 | 12/2013 | Fernandes et al. |
| 8,596,529 | B1 | 12/2013 | Kolls |
| 8,600,899 | B1 | 12/2013 | Davis |
| 8,606,702 | B2 | 12/2013 | Ruckart |
| 8,615,445 | B2 | 12/2013 | Dorsey et al. |
| 8,640,947 | B1 | 2/2014 | Lewis et al. |
| 8,645,971 | B2 | 2/2014 | Carlson et al. |
| 8,700,530 | B2 | 4/2014 | Smith |
| 8,707,276 | B2 | 4/2014 | Hill et al. |
| 8,712,893 | B1 | 4/2014 | Brandmaier |
| 8,761,809 | B2 | 6/2014 | Faith et al. |
| 8,769,643 | B1 | 7/2014 | Ben Ayed |
| 8,788,341 | B1 | 7/2014 | Patel |
| 8,794,734 | B2 | 8/2014 | Drummond |
| 8,810,430 | B2 | 8/2014 | Proud |
| 8,819,659 | B2 | 8/2014 | Ramer et al. |
| 8,831,677 | B2 | 9/2014 | Villa-Real |
| 8,838,481 | B2 | 9/2014 | Moshfeghi |
| 8,840,016 | B1 | 9/2014 | Schott et al. |
| 8,850,421 | B2 | 9/2014 | Proud |
| 8,856,045 | B1 | 10/2014 | Patel et al. |
| 8,881,975 | B1 | 11/2014 | Matthews |
| 8,898,620 | B2 | 11/2014 | Eizenman et al. |
| 8,903,737 | B2 | 12/2014 | Cameron et al. |
| 8,958,846 | B2 | 2/2015 | Freeny, Jr. |
| 8,976,947 | B2 | 3/2015 | Joyce et al. |
| 9,001,047 | B2 | 4/2015 | Forstall |
| 9,037,492 | B2 | 5/2015 | White |
| 9,047,639 | B1 | 6/2015 | Quintilian et al. |
| 9,092,768 | B2 | 7/2015 | Breitenbach et al. |
| 9,098,961 | B1 | 8/2015 | Block et al. |
| 9,210,247 | B2 | 12/2015 | Vance et al. |
| 9,262,771 | B1 | 2/2016 | Patel |
| 9,272,713 | B1 | 3/2016 | Dvoskin et al. |
| 9,395,888 | B2 | 7/2016 | Schiplacoff et al. |
| 9,424,603 | B2 | 8/2016 | Hammad |
| 9,466,082 | B1 | 10/2016 | Dabiri |
| 9,483,763 | B2 | 11/2016 | Van Os et al. |
| 9,547,859 | B2 | 1/2017 | Patel |
| 9,659,296 | B2 | 5/2017 | Patel |
| 9,875,473 | B2 | 1/2018 | Patel |
| 9,898,884 | B1 | 2/2018 | Arora et al. |
| 9,911,290 | B1 * | 3/2018 | Zalewski .............. H04W 76/10 |
| 9,922,370 | B2 | 3/2018 | Kobres et al. |
| 10,026,078 | B1 | 7/2018 | Nolan |
| 10,121,318 | B2 | 11/2018 | LeMay et al. |
| 10,163,292 | B1 | 12/2018 | Romero |
| 10,185,936 | B2 | 1/2019 | O'Leary et al. |
| 10,210,501 | B2 | 2/2019 | Low et al. |
| 10,217,151 | B1 | 2/2019 | Greiner et al. |
| 10,304,057 | B1 | 5/2019 | Powell |
| 10,380,573 | B2 | 8/2019 | Lin et al. |
| 10,410,194 | B1 | 9/2019 | Grassadonia |
| 10,423,949 | B2 | 9/2019 | Lyons et al. |
| 10,438,208 | B2 | 10/2019 | Patel et al. |
| 10,467,604 | B1 | 11/2019 | Dorsch et al. |

(56) References Cited

U.S. PATENT DOCUMENTS

| | | | |
|---|---|---|---|
| 10,528,944 | B2 | 1/2020 | Khan |
| 10,538,220 | B1 | 1/2020 | Tyagi et al. |
| 10,607,465 | B1* | 3/2020 | Subramanian ..... G08B 13/2454 |
| 10,719,833 | B2 | 7/2020 | Patel et al. |
| 10,824,828 | B2 | 11/2020 | Ostri |
| 10,891,608 | B2 | 1/2021 | Patel |
| 10,891,614 | B2 | 1/2021 | Patel |
| 10,964,185 | B1* | 3/2021 | Subramanian ..... G07C 9/00896 |
| 10,977,642 | B2 | 4/2021 | Khan |
| 11,010,759 | B1 | 5/2021 | Maeng |
| 11,042,852 | B1 | 6/2021 | Wadhwa |
| 11,074,577 | B1 | 7/2021 | Soccorsy et al. |
| 11,074,580 | B2 | 7/2021 | Patel |
| 11,182,794 | B1 | 11/2021 | Aument |
| 11,227,275 | B2 | 1/2022 | Van Heerden et al. |
| 11,308,462 | B2 | 4/2022 | Berman et al. |
| 11,373,147 | B1 | 6/2022 | Moore |
| 11,481,772 | B2 | 10/2022 | Patel |
| 11,488,174 | B2 | 11/2022 | Patel |
| 11,495,104 | B1* | 11/2022 | Subramanian ..... G08B 13/2454 |
| 11,501,296 | B2 | 11/2022 | Patel |
| 11,564,266 | B1 | 1/2023 | Kahn |
| 11,935,051 | B2 | 3/2024 | Patel |
| 11,938,692 | B2 | 3/2024 | Hockings |
| 11,961,107 | B2 | 4/2024 | Patel |
| 11,966,895 | B2 | 4/2024 | Patel et al. |
| 11,966,898 | B2 | 4/2024 | Patel |
| 11,966,920 | B2* | 4/2024 | Patel .................... G07F 7/0893 |
| 11,966,926 | B2 | 4/2024 | Patel et al. |
| 11,972,423 | B2* | 4/2024 | Patel ...................... G07F 9/023 |
| 12,008,875 | B1* | 6/2024 | Subramanian ..... G08B 13/2454 |
| 12,086,811 | B2 | 9/2024 | Patel |
| 12,093,962 | B2 | 9/2024 | Patel |
| 12,093,963 | B2 | 9/2024 | Patel |
| 12,124,881 | B2 | 10/2024 | Talavera |
| 12,399,958 | B2* | 8/2025 | Patel ...................... G06F 21/00 |
| 12,524,769 | B2 | 1/2026 | Patel et al. |
| 12,548,018 | B2 | 2/2026 | Patel |
| 12,548,032 | B2 | 2/2026 | Patel et al. |
| 2002/0016740 | A1 | 2/2002 | Ogasawara |
| 2002/0152123 | A1 | 10/2002 | Giordano et al. |
| 2002/0164953 | A1 | 11/2002 | Curtis |
| 2003/0009385 | A1 | 1/2003 | Tucciarone |
| 2003/0089767 | A1 | 5/2003 | Kiyomatsu |
| 2003/0101096 | A1 | 5/2003 | Suzuki et al. |
| 2003/0110097 | A1 | 6/2003 | Lei |
| 2003/0130902 | A1 | 7/2003 | Athwal |
| 2003/0158891 | A1 | 8/2003 | Lei et al. |
| 2003/0172028 | A1 | 9/2003 | Abell et al. |
| 2003/0191811 | A1 | 10/2003 | Hashem |
| 2003/0206542 | A1 | 11/2003 | Holder |
| 2003/0236872 | A1 | 12/2003 | Atkinson |
| 2004/0029569 | A1 | 2/2004 | Khan et al. |
| 2004/0049454 | A1 | 3/2004 | Kanno et al. |
| 2004/0117262 | A1 | 6/2004 | Berger et al. |
| 2004/0122685 | A1 | 6/2004 | Bunce et al. |
| 2004/0133653 | A1 | 7/2004 | Defosse |
| 2005/0021459 | A1 | 1/2005 | Bell |
| 2005/0043011 | A1* | 2/2005 | Murray ................ H04W 68/00 455/403 |
| 2005/0080510 | A1 | 4/2005 | Bates |
| 2005/0101295 | A1 | 5/2005 | Rupp |
| 2005/0177798 | A1 | 8/2005 | Thomson et al. |
| 2005/0181804 | A1 | 8/2005 | Misikangas et al. |
| 2005/0232421 | A1 | 10/2005 | Simons et al. |
| 2005/0234776 | A1 | 10/2005 | Jacoves |
| 2005/0263583 | A1 | 12/2005 | Schlabach et al. |
| 2006/0043175 | A1 | 3/2006 | Fu et al. |
| 2006/0052157 | A1 | 3/2006 | Walker et al. |
| 2006/0123335 | A1 | 6/2006 | Sanchez et al. |
| 2007/0050083 | A1 | 3/2007 | Signorelli et al. |
| 2007/0080215 | A1 | 4/2007 | Ramachandran et al. |
| 2007/0083287 | A1 | 4/2007 | Defosse et al. |
| 2007/0095901 | A1 | 5/2007 | Illingworth |
| 2007/0119680 | A1 | 5/2007 | Saltsov et al. |
| 2007/0159994 | A1 | 7/2007 | Brown et al. |
| 2007/0186105 | A1 | 8/2007 | Bailey et al. |
| 2007/0187491 | A1 | 8/2007 | Godwin et al. |
| 2007/0227856 | A1 | 10/2007 | Gopel |
| 2007/0250920 | A1 | 10/2007 | Lindsay |
| 2007/0255653 | A1 | 11/2007 | Tumminaro |
| 2008/0010190 | A1 | 1/2008 | Rackley, III et al. |
| 2008/0010193 | A1 | 1/2008 | Rackley, III et al. |
| 2008/0033880 | A1 | 2/2008 | Fiebiger et al. |
| 2008/0040265 | A1 | 2/2008 | Rackley, III et al. |
| 2008/0126213 | A1 | 5/2008 | Robertson et al. |
| 2008/0141033 | A1 | 6/2008 | Ginter et al. |
| 2008/0154727 | A1 | 6/2008 | Carlson |
| 2008/0154735 | A1 | 6/2008 | Carlson |
| 2008/0163257 | A1 | 7/2008 | Carlson et al. |
| 2008/0167017 | A1 | 7/2008 | Wentker et al. |
| 2008/0167991 | A1 | 7/2008 | Carlson et al. |
| 2008/0183480 | A1 | 7/2008 | Carlson et al. |
| 2008/0201226 | A1 | 8/2008 | Carlson et al. |
| 2008/0208762 | A1 | 8/2008 | Arthur et al. |
| 2008/0249658 | A1 | 10/2008 | Walker et al. |
| 2008/0254853 | A1 | 10/2008 | Wright et al. |
| 2008/0255947 | A1 | 10/2008 | Friedman |
| 2008/0319913 | A1 | 12/2008 | Wiechers |
| 2009/0006196 | A1* | 1/2009 | Barkan .............. G06K 7/10881 705/14.34 |
| 2009/0037284 | A1 | 2/2009 | Lewis et al. |
| 2009/0076896 | A1 | 3/2009 | Dewitt |
| 2009/0099961 | A1 | 4/2009 | Ogilvy |
| 2009/0101705 | A1 | 4/2009 | Jenkins et al. |
| 2009/0106160 | A1 | 4/2009 | Skowronek |
| 2009/0119190 | A1 | 5/2009 | Realini |
| 2009/0157515 | A1 | 6/2009 | LaFauci et al. |
| 2009/0171682 | A1 | 7/2009 | Dixon et al. |
| 2009/0281891 | A1 | 11/2009 | Walker et al. |
| 2009/0287349 | A1 | 11/2009 | Mardiks |
| 2009/0288173 | A1 | 11/2009 | Mardiks |
| 2009/0303982 | A1 | 12/2009 | Blachman et al. |
| 2009/0306818 | A1 | 12/2009 | Slagley et al. |
| 2009/0306819 | A1 | 12/2009 | Insolia |
| 2009/0313125 | A1 | 12/2009 | Roh et al. |
| 2009/0313132 | A1 | 12/2009 | Kenna et al. |
| 2009/0327089 | A1 | 12/2009 | Kanno et al. |
| 2010/0061294 | A1 | 3/2010 | Proctor, Jr. |
| 2010/0082485 | A1 | 4/2010 | Lin et al. |
| 2010/0094456 | A1 | 4/2010 | Simpkins et al. |
| 2010/0105454 | A1 | 4/2010 | Weber et al. |
| 2010/0198400 | A1 | 8/2010 | Pascal |
| 2010/0227671 | A1 | 9/2010 | Laaroussi et al. |
| 2010/0276484 | A1 | 11/2010 | Banerjee |
| 2010/0280956 | A1 | 11/2010 | Chutorash |
| 2010/0312692 | A1 | 12/2010 | Teicher |
| 2010/0320266 | A1 | 12/2010 | White |
| 2010/0329285 | A1 | 12/2010 | Stanton |
| 2011/0029405 | A1 | 2/2011 | Cronin |
| 2011/0040686 | A1 | 2/2011 | Carlson |
| 2011/0125561 | A1 | 5/2011 | Marcus |
| 2011/0153436 | A1 | 6/2011 | Krampe |
| 2011/0153442 | A1 | 6/2011 | Krampe |
| 2011/0153495 | A1 | 6/2011 | Dixon et al. |
| 2011/0172848 | A1 | 7/2011 | Breitenbach et al. |
| 2011/0178883 | A1 | 7/2011 | Granbery |
| 2011/0225067 | A1 | 9/2011 | Dunwoody |
| 2011/0238476 | A1 | 9/2011 | Carr |
| 2011/0244799 | A1 | 10/2011 | Roberts et al. |
| 2011/0251892 | A1 | 10/2011 | Laracey |
| 2011/0251910 | A1 | 10/2011 | Dimmick |
| 2011/0276636 | A1 | 11/2011 | Cheng et al. |
| 2011/0289023 | A1 | 11/2011 | Forster et al. |
| 2012/0011024 | A1 | 1/2012 | Dorsey et al. |
| 2012/0016731 | A1 | 1/2012 | Smith et al. |
| 2012/0029691 | A1 | 2/2012 | Mockus et al. |
| 2012/0030047 | A1 | 2/2012 | Fuentes |
| 2012/0036045 | A1 | 2/2012 | Lowe et al. |
| 2012/0066096 | A1 | 3/2012 | Penide |
| 2012/0078735 | A1 | 3/2012 | Bauer et al. |
| 2012/0108173 | A1 | 5/2012 | Hahm et al. |
| 2012/0122585 | A1 | 5/2012 | Nguyen |
| 2012/0136478 | A1 | 5/2012 | Anand |

(56) References Cited

U.S. PATENT DOCUMENTS

| | | | |
|---|---|---|---|
| 2012/0150742 A1 | 6/2012 | Poon et al. | |
| 2012/0158172 A1 | 6/2012 | Wencslao | |
| 2012/0158528 A1 | 6/2012 | Hsu et al. | |
| 2012/0160912 A1 | 6/2012 | Laracey | |
| 2012/0173325 A1 | 7/2012 | Johri | |
| 2012/0197740 A1 | 8/2012 | Grigg et al. | |
| 2012/0203666 A1 | 8/2012 | Torossian et al. | |
| 2012/0223134 A1 | 9/2012 | Smith et al. | |
| 2012/0231844 A1 | 9/2012 | Coppinger | |
| 2012/0246074 A1 | 9/2012 | Annamalai et al. | |
| 2012/0253852 A1 | 10/2012 | Pourfallah | |
| 2012/0254631 A1 | 10/2012 | Skillman et al. | |
| 2012/0255653 A1 | 10/2012 | Chin | |
| 2012/0258773 A1 | 10/2012 | Alvarez Rivera | |
| 2012/0276845 A1 | 11/2012 | Wikander | |
| 2012/0280789 A1 | 11/2012 | Gerhardt et al. | |
| 2012/0290472 A1 | 11/2012 | Mullen et al. | |
| 2012/0296826 A1 | 11/2012 | Bergdale et al. | |
| 2012/0303528 A1 | 11/2012 | Weiner et al. | |
| 2012/0316963 A1 | 12/2012 | Moshfeghi | |
| 2012/0330764 A1 | 12/2012 | Nahidipour | |
| 2012/0330769 A1 | 12/2012 | Arceo | |
| 2012/0330844 A1 | 12/2012 | Kaufman | |
| 2013/0030931 A1 | 1/2013 | Moshfeghi | |
| 2013/0054016 A1 | 2/2013 | Canter et al. | |
| 2013/0054336 A1 | 2/2013 | Graylin | |
| 2013/0054395 A1 | 2/2013 | Cyr et al. | |
| 2013/0067365 A1 | 3/2013 | Shrufi et al. | |
| 2013/0085835 A1 | 4/2013 | Horowitz | |
| 2013/0087050 A1 | 4/2013 | Studor et al. | |
| 2013/0100886 A1 | 4/2013 | Cherian | |
| 2013/0102246 A1 | 4/2013 | Gagne et al. | |
| 2013/0110296 A1 | 5/2013 | Khoo | |
| 2013/0117490 A1 | 5/2013 | Harriman | |
| 2013/0117738 A1 | 5/2013 | Livingston et al. | |
| 2013/0124289 A1 | 5/2013 | Fisher | |
| 2013/0126607 A1 | 5/2013 | Behjat | |
| 2013/0143498 A1 | 6/2013 | Niemi | |
| 2013/0166448 A1 | 6/2013 | Narayanan | |
| 2013/0185150 A1 | 7/2013 | Crum | |
| 2013/0191213 A1 | 7/2013 | Beck et al. | |
| 2013/0191789 A1 | 7/2013 | Calman | |
| 2013/0210461 A1* | 8/2013 | Moldavsky | H04W 4/02 |
| | | | 455/456.3 |
| 2013/0217333 A1 | 8/2013 | Sprigg et al. | |
| 2013/0246171 A1 | 9/2013 | Carapelli | |
| 2013/0246364 A1 | 9/2013 | Bhavith | |
| 2013/0267121 A1 | 10/2013 | Hsu | |
| 2013/0267176 A1 | 10/2013 | Hertel et al. | |
| 2013/0275303 A1 | 10/2013 | Fiore | |
| 2013/0275305 A1 | 10/2013 | Duplan | |
| 2013/0278622 A1 | 10/2013 | Sun et al. | |
| 2013/0282590 A1 | 10/2013 | Rajarethnam et al. | |
| 2013/0284806 A1* | 10/2013 | Margalit | G07G 1/0009 |
| | | | 235/382 |
| 2013/0297422 A1 | 11/2013 | Hunter et al. | |
| 2013/0311379 A1 | 11/2013 | Smith | |
| 2013/0311382 A1 | 11/2013 | Fosmark et al. | |
| 2013/0331985 A1 | 12/2013 | Felique | |
| 2013/0332293 A1 | 12/2013 | Ran | |
| 2013/0346302 A1 | 12/2013 | Purves et al. | |
| 2013/0346305 A1 | 12/2013 | Mendes | |
| 2014/0006451 A1 | 1/2014 | Mullis et al. | |
| 2014/0012414 A1 | 1/2014 | Pérez et al. | |
| 2014/0019367 A1 | 1/2014 | Khan et al. | |
| 2014/0025958 A1 | 1/2014 | Calman | |
| 2014/0032410 A1 | 1/2014 | Georgiev et al. | |
| 2014/0032413 A1 | 1/2014 | Low | |
| 2014/0040028 A1 | 2/2014 | King et al. | |
| 2014/0040117 A1 | 2/2014 | Jain | |
| 2014/0046842 A1 | 2/2014 | Irudayam et al. | |
| 2014/0052463 A1 | 2/2014 | Cashman et al. | |
| 2014/0052524 A1 | 2/2014 | Andersen | |
| 2014/0052607 A1 | 2/2014 | Park | |
| 2014/0064116 A1 | 3/2014 | Linde et al. | |
| 2014/0067542 A1 | 3/2014 | Everingham | |
| 2014/0074714 A1 | 3/2014 | Melone et al. | |
| 2014/0074723 A1 | 3/2014 | Kamat | |
| 2014/0085046 A1 | 3/2014 | Shin et al. | |
| 2014/0085109 A1 | 3/2014 | Stefik | |
| 2014/0089016 A1 | 3/2014 | Smullin | |
| 2014/0089185 A1 | 3/2014 | Desai et al. | |
| 2014/0100977 A1 | 4/2014 | Davis | |
| 2014/0108108 A1 | 4/2014 | Artman | |
| 2014/0122298 A1 | 5/2014 | Oyer | |
| 2014/0136301 A1 | 5/2014 | Valdes | |
| 2014/0136411 A1 | 5/2014 | Cho | |
| 2014/0143055 A1 | 5/2014 | Johnson | |
| 2014/0143074 A1 | 5/2014 | Kolls | |
| 2014/0143137 A1 | 5/2014 | Carlson | |
| 2014/0151449 A1 | 6/2014 | Jenkins et al. | |
| 2014/0158768 A1 | 6/2014 | Ray et al. | |
| 2014/0172179 A1 | 6/2014 | Baudin | |
| 2014/0180852 A1 | 6/2014 | Kamat | |
| 2014/0188708 A1 | 7/2014 | Govindarajan et al. | |
| 2014/0201066 A1 | 7/2014 | Roux et al. | |
| 2014/0249995 A1 | 9/2014 | Ogilvy | |
| 2014/0278989 A1 | 9/2014 | Calman | |
| 2014/0279008 A1 | 9/2014 | Calman | |
| 2014/0279101 A1 | 9/2014 | Duplan et al. | |
| 2014/0279426 A1 | 9/2014 | Holman et al. | |
| 2014/0279537 A1 | 9/2014 | Cicoretti | |
| 2014/0279556 A1 | 9/2014 | Priebatsch | |
| 2014/0289047 A1 | 9/2014 | Yee | |
| 2014/0317611 A1 | 10/2014 | Wojcik et al. | |
| 2014/0324627 A1 | 10/2014 | Haver | |
| 2014/0337235 A1 | 11/2014 | Van Heerden et al. | |
| 2014/0351099 A1 | 11/2014 | Zhu | |
| 2014/0351125 A1 | 11/2014 | Miller et al. | |
| 2014/0361872 A1 | 12/2014 | Garcia et al. | |
| 2014/0378057 A1 | 12/2014 | Ramon et al. | |
| 2015/0006421 A1 | 1/2015 | Pearson | |
| 2015/0019433 A1 | 1/2015 | Leger | |
| 2015/0051977 A1 | 2/2015 | Lyman | |
| 2015/0052045 A1 | 2/2015 | De Luca et al. | |
| 2015/0073980 A1 | 3/2015 | Griffin et al. | |
| 2015/0081462 A1 | 3/2015 | Ozvat et al. | |
| 2015/0088698 A1 | 3/2015 | Ackerman | |
| 2015/0100152 A1 | 4/2015 | Trevino et al. | |
| 2015/0105901 A1 | 4/2015 | Joshi et al. | |
| 2015/0120546 A1 | 4/2015 | Fernandes | |
| 2015/0120555 A1 | 4/2015 | Jung | |
| 2015/0149992 A1 | 5/2015 | Wade et al. | |
| 2015/0154579 A1 | 6/2015 | Teicher | |
| 2015/0169312 A1 | 6/2015 | Patel | |
| 2015/0170131 A1 | 6/2015 | Patel | |
| 2015/0170132 A1 | 6/2015 | Patel | |
| 2015/0170136 A1 | 6/2015 | Patel | |
| 2015/0178702 A1 | 6/2015 | Patel | |
| 2015/0206128 A1 | 7/2015 | Torossian et al. | |
| 2015/0220381 A1 | 8/2015 | Horagan et al. | |
| 2015/0227913 A1 | 8/2015 | Ballout | |
| 2015/0235202 A1 | 8/2015 | Zabala | |
| 2015/0278811 A1 | 10/2015 | Lalchandani | |
| 2015/0286209 A1 | 10/2015 | Kreuzer et al. | |
| 2015/0287085 A1 | 10/2015 | Windmueller | |
| 2015/0302377 A1 | 10/2015 | Sweitzer | |
| 2015/0302411 A1 | 10/2015 | Bondesen et al. | |
| 2015/0317720 A1 | 11/2015 | Ramaratnam | |
| 2015/0332029 A1 | 11/2015 | Coxe | |
| 2015/0346994 A1 | 12/2015 | Chanyontpatanakul | |
| 2015/0373537 A1 | 12/2015 | Toksvig | |
| 2015/0379491 A1 | 12/2015 | Ma et al. | |
| 2016/0012465 A1 | 1/2016 | Sharp | |
| 2016/0019604 A1 | 1/2016 | Kobayashi | |
| 2016/0063476 A1 | 3/2016 | Baldie | |
| 2016/0086145 A1 | 3/2016 | Tsutsui | |
| 2016/0092859 A1 | 3/2016 | Klingen | |
| 2016/0098690 A1 | 4/2016 | Silvia et al. | |
| 2016/0132870 A1 | 5/2016 | Xu et al. | |
| 2016/0196220 A1 | 7/2016 | Perez et al. | |
| 2016/0232515 A1 | 8/2016 | Jhas | |
| 2016/0260081 A1 | 9/2016 | Zermeño | |
| 2016/0292469 A1 | 10/2016 | Ianni | |

(56) References Cited

U.S. PATENT DOCUMENTS

| | | |
|---|---|---|
| 2016/0335620 A1 | 11/2016 | Lyons et al. |
| 2016/0350744 A1 | 12/2016 | Tang et al. |
| 2017/0006656 A1 | 1/2017 | Nacer et al. |
| 2017/0017958 A1 | 1/2017 | Scott et al. |
| 2017/0083882 A1 | 3/2017 | Kim et al. |
| 2017/0092062 A1 | 3/2017 | Tsutsui |
| 2017/0148009 A1 | 5/2017 | Lafuente |
| 2017/0161728 A1 | 6/2017 | Satyanarayan et al. |
| 2017/0178116 A1 | 6/2017 | Savolainen et al. |
| 2017/0193478 A1 | 7/2017 | Dhurka |
| 2017/0193479 A1 | 7/2017 | Kamat |
| 2017/0193508 A1 | 7/2017 | Patel et al. |
| 2017/0330164 A1 | 11/2017 | Suelberg et al. |
| 2018/0005220 A1 | 1/2018 | Laracey |
| 2018/0096323 A1 | 4/2018 | Barber et al. |
| 2018/0096554 A1 | 4/2018 | Hough et al. |
| 2018/0165908 A1 | 6/2018 | Patel et al. |
| 2018/0197167 A1 | 7/2018 | Ganesan et al. |
| 2018/0240096 A1 | 8/2018 | Patel |
| 2018/0276674 A1 | 9/2018 | Ramatchandirane et al. |
| 2018/0293573 A1 | 10/2018 | Ortiz et al. |
| 2018/0315271 A1 | 11/2018 | Gharabegian et al. |
| 2018/0374076 A1 | 12/2018 | Wheeler et al. |
| 2019/0213832 A1 | 7/2019 | Tsutsui |
| 2019/0236586 A1 | 8/2019 | Mei et al. |
| 2019/0244205 A1 | 8/2019 | Fieglein |
| 2019/0244465 A1 | 8/2019 | Saunders et al. |
| 2019/0272539 A1 | 9/2019 | Bogaard |
| 2019/0340604 A1 | 11/2019 | Nadella et al. |
| 2020/0126059 A1 | 4/2020 | Kudssi et al. |
| 2020/0250948 A1* | 8/2020 | Ball ..................... G08B 13/248 |
| 2020/0342507 A1 | 10/2020 | Hubbard et al. |
| 2020/0351477 A1 | 11/2020 | Rabinowitz et al. |
| 2020/0387881 A1 | 12/2020 | Smith et al. |
| 2021/0012318 A1 | 1/2021 | Ducoulombier |
| 2021/0056552 A1 | 2/2021 | Murray |
| 2021/0158309 A1 | 5/2021 | Mcginlay et al. |
| 2021/0158322 A1 | 5/2021 | Cohn et al. |
| 2021/0192479 A1 | 6/2021 | Swaminathan |
| 2021/0209671 A1 | 7/2021 | Barela et al. |
| 2021/0312440 A1 | 10/2021 | Badal Badalian et al. |
| 2021/0334925 A1* | 10/2021 | Peacock .............. H04W 12/009 |
| 2021/0357932 A1 | 11/2021 | Patel |
| 2021/0375094 A1 | 12/2021 | Thomas et al. |
| 2021/0406970 A1 | 12/2021 | Patel et al. |
| 2022/0024014 A1 | 1/2022 | Obermann et al. |
| 2022/0172549 A1 | 6/2022 | Chung et al. |
| 2022/0263886 A1 | 8/2022 | Rose |
| 2022/0292543 A1 | 9/2022 | Henderson |
| 2022/0405733 A1 | 12/2022 | Yao et al. |
| 2023/0042066 A1* | 2/2023 | Liff ...................... H04W 12/65 |
| 2023/0222506 A1 | 7/2023 | Patel et al. |
| 2023/0222507 A1 | 7/2023 | Patel et al. |
| 2023/0274274 A1 | 8/2023 | Patel |
| 2023/0281621 A1 | 9/2023 | Patel |
| 2023/0289811 A1 | 9/2023 | Patel et al. |
| 2023/0297987 A1 | 9/2023 | Patel |
| 2024/0257093 A1 | 8/2024 | Wulff et al. |
| 2024/0257100 A1 | 8/2024 | Bimolaksono et al. |
| 2024/0273497 A1 | 8/2024 | Patel et al. |
| 2024/0273498 A1 | 8/2024 | Patel |
| 2024/0273526 A1 | 8/2024 | Patel |
| 2024/0273527 A1 | 8/2024 | Patel |
| 2024/0273528 A1 | 8/2024 | Patel |
| 2024/0273541 A1 | 8/2024 | Patel |
| 2024/0330974 A1 | 10/2024 | Patel |
| 2024/0338693 A1 | 10/2024 | Patel |
| 2024/0428254 A1 | 12/2024 | Patel et al. |
| 2025/0014044 A1 | 1/2025 | Patel et al. |
| 2025/0029108 A1 | 1/2025 | Patel |
| 2025/0094977 A1 | 3/2025 | Patel et al. |
| 2025/0209467 A1 | 6/2025 | Patel et al. |
| 2025/0315809 A1 | 10/2025 | Patel |
| 2025/0315838 A1 | 10/2025 | Patel et al. |
| 2025/0390557 A1 | 12/2025 | Patel |

FOREIGN PATENT DOCUMENTS

| | | |
|---|---|---|
| CA | 2414812 A1 | 6/2000 |
| CA | 2624981 C | 6/2017 |
| CA | 3028753 A1 | 7/2019 |
| CN | 103946879 A | 7/2014 |
| CN | 104899742 A | 9/2015 |
| CN | 105139196 A | 12/2015 |
| CN | 106462910 A | 2/2017 |
| CN | 109118199 A | 1/2019 |
| CN | 111316301 A | 6/2020 |
| CN | 115485782 A | 12/2022 |
| DE | 102005045947 B4 | 11/2017 |
| DE | 102005063650 B3 | 3/2019 |
| EA | 003681 B1 | 10/2001 |
| EP | 1175079 A1 | 1/2002 |
| EP | 3289548 B2 | 11/2021 |
| GB | 2288365 A | 10/1995 |
| JP | H04209085 A | 7/1992 |
| JP | 2003536174 A | 6/2001 |
| JP | 2002334284 A | 11/2002 |
| JP | 2004013910 A | 1/2004 |
| JP | 2004152228 A | 5/2004 |
| JP | WO2003017157 A | 12/2004 |
| JP | 4337257 B2 | 9/2009 |
| JP | 4515619 B2 | 8/2010 |
| JP | 2011192293 A | 9/2011 |
| JP | 4929219 B2 | 5/2012 |
| JP | 7289565 B2 | 6/2023 |
| KR | 100366852 B1 | 1/2003 |
| KR | 100376117 B1 | 3/2003 |
| KR | 20170074855 A | 6/2017 |
| KR | 20170140189 A | 12/2017 |
| WO | WO2006021825 A1 | 3/2006 |
| WO | WO2009089163 A1 | 7/2009 |
| WO | WO2014158817 A1 | 10/2014 |
| WO | WO2015131769 A1 | 9/2015 |
| WO | WO2016137271 A1 | 9/2016 |
| WO | WO2023037112 A1 | 3/2023 |

OTHER PUBLICATIONS

Patel, Non-Final Office Action, U.S. Appl. No. 18/610,033, Feb. 27, 2025, 9 pgs.

Patel, Notice of Allowance, U.S. Appl. No. 18/888,036, Mar. 19, 2025, 10 pgs.

Patel, Non-Final Office Action, U.S. Appl. No. 18/963,481, Mar. 21, 2025, 24 pgs.

Tao-Ku Chang et al., "A Secure Cloud-Based Payment Model for M-Commerce," 2013 42nd International Conference on Parallel Processing, Lyon, France, 2013, pp. 1082-1086, 5 pgs. doi: 10.1109/ICPP.2013.129. keywords: {Mobile communication;XML;Servers;Access control;Smart phones;MobilePayment;Web Services;Cloud Security}.

Payrange, Inc., PCT/US2024/057922, International Search Report and Written Opinion, Mar. 12, 2025, 15 pgs.

Patel, Corrected Notice of Allowability, U.S. Appl. No. 18/643,968, Feb. 4, 2025, 3 pgs.

Patel, Notice of Allowance, U.S. Appl. No. 19/019,281, Apr. 18, 2025, 11 pgs.

Goetting, "Device Description HG G-76343/4/5", WLAN Radio Modem 802.11 a/b/g/n, Top Hat Rail or Flange Casing, Jan. 24, 2024, 130 pgs. www.goetting-agv.com.

Patel, Non-Final Office Action, U.S. Appl. No. 19/077,043, May, 13, 2025, 12 pgs.

Patel, Non-Final Office Action, U.S. Appl. No. 18/636,314, May 14, 2025, 13 pgs.

Patel, Final Office Action, U.S. Appl. No. 18/963,481, Jul. 14, 2025, 16 pgs.

A. M. Elshaer et al., "IoT-Enabled E-Prescription Management and Dispensing Machine Monitoring", Published in: 2024 14th International Conference on Electrical Engineering (ICEENG), Date Added to IEEE Xplore: Jun. 25, 2024, Cairo, Egypt, 5 pgs.

Patel, Notice of Allowance, U.S. Appl. No. 19/077,043, Sep. 9, 2025, 16 pgs.

(56) References Cited

OTHER PUBLICATIONS

PayRange Inc., International Search Report and Written Opinion, PCT/US2025/011459, Aug. 22, 2025, 23 pgs.

PGR2025-00027 Petition—U.S. Pat. No. 11,966,920 B2, dated Aug. 25, 2025, 57 pgs.

PGR2025-00028 Petition—U.S. Pat. No. 11,972,423, B2, dated Aug. 25, 2025, 45 pgs.

Patel, Notice of Allowance, U.S. Appl. No. 18/610,033, Oct. 7, 2025, 8 pgs.

Patel, Notice of Allowance, U.S. Appl. No. 18/830,424, Oct. 14, 2025, 16 pgs.

Patel, Non-Final Office Action, U.S. Appl. No. 18/952,804, Nov. 28, 2025, 9 pgs.

Patel, Non-Final Office Action, U.S. Appl. No.18/952,778, Dec. 17, 2025, 23 pgs.

Patel, Corrected Notice of Allowability, U.S. Appl. No. 19/077,043, Dec. 17, 2025, 3 pgs.

Patel, Corrected Notice of Allowability, U.S. Appl. No. 18/830,424, Dec. 17, 2025, 3 pgs.

Patel, Corrected Notice of Allowability, U.S. Appl. No. 18/610,033, Dec. 19, 2025, 5 pgs.

Patel, Notice of Allowance, U.S. Appl. No. 18/643,965, Jan. 15, 2026, 20 pgs.

A. Vizzarri and F. Vatalaro, "m-Payment systems: Technologies and business models," 2014 Euro Med Telco Conference (EMTC), Naples, Italy, 2014, https://ieeexplore.ieee.org/document/6996626?source=1Oplus. (Year: 2014).

R. Martinez-Pelaez, F. Rico-Novella and C. Satizabal, "Mobile Payment Protocol for Micropayments: Withdrawal and Payment Anonymous," 2008 New Technologies, Mobility and Security, Tangier, Morocco, 2008, https://ieeexplore.ieee.org/document/4689115?source=IOplus. (Year: 2008).

* cited by examiner

100

600

700

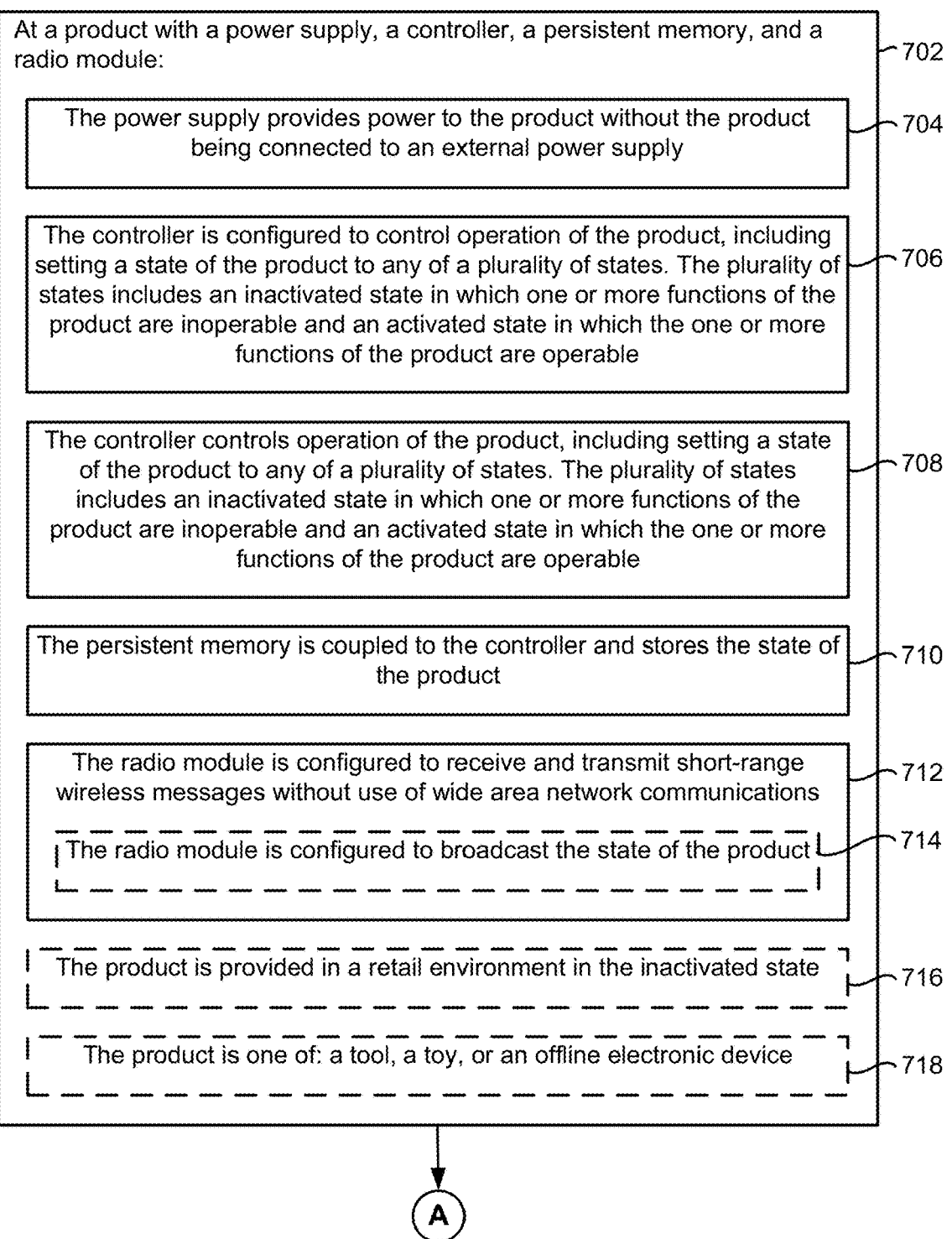

At a product with a power supply, a controller, a persistent memory, and a radio module:    702

The power supply provides power to the product without the product being connected to an external power supply    704

The controller is configured to control operation of the product, including setting a state of the product to any of a plurality of states. The plurality of states includes an inactivated state in which one or more functions of the product are inoperable and an activated state in which the one or more functions of the product are operable    706

The controller controls operation of the product, including setting a state of the product to any of a plurality of states. The plurality of states includes an inactivated state in which one or more functions of the product are inoperable and an activated state in which the one or more functions of the product are operable    708

The persistent memory is coupled to the controller and stores the state of the product    710

The radio module is configured to receive and transmit short-range wireless messages without use of wide area network communications    712

The radio module is configured to broadcast the state of the product    714

The product is provided in a retail environment in the inactivated state    716

The product is one of: a tool, a toy, or an offline electronic device    718

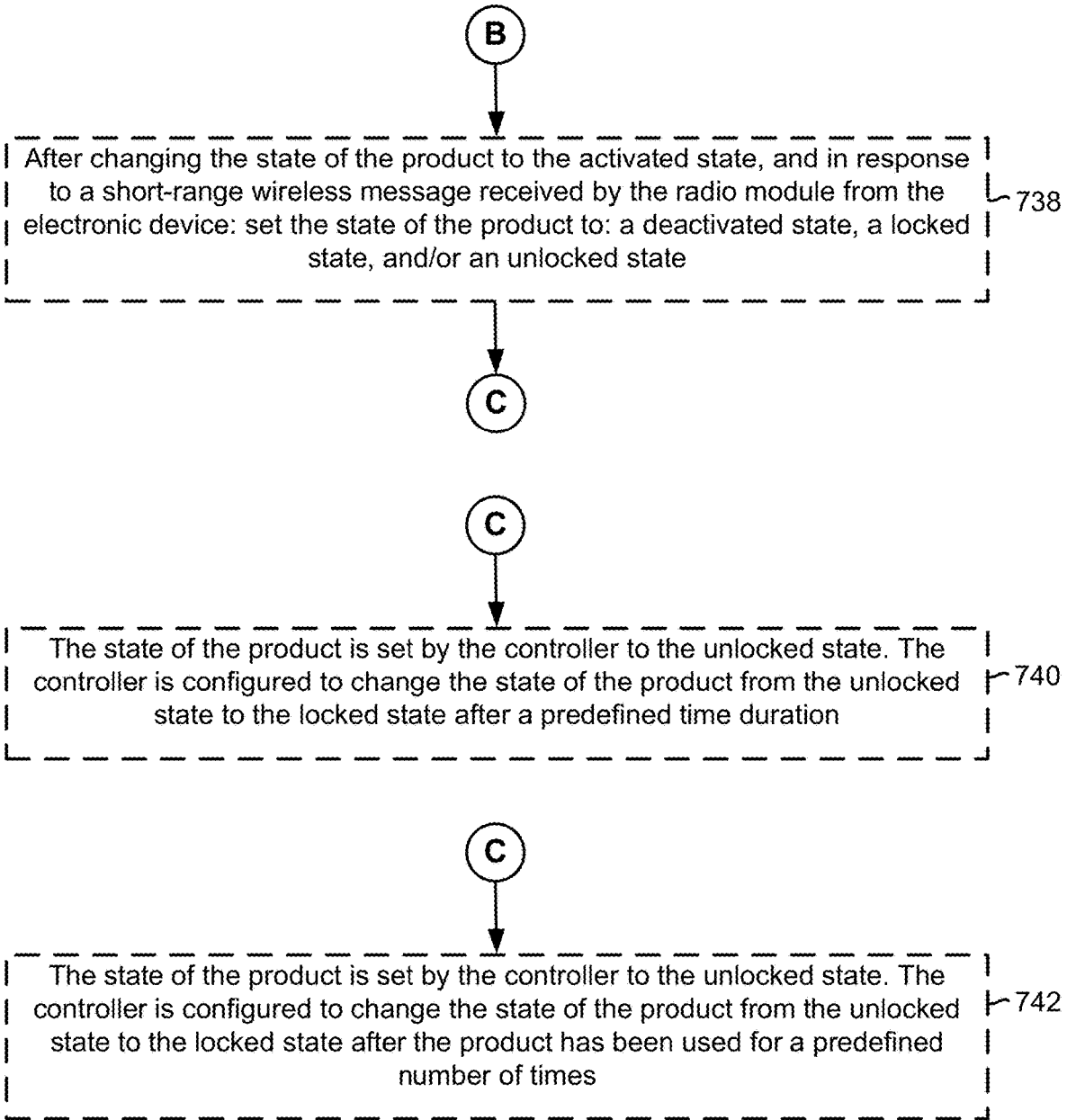

B

After changing the state of the product to the activated state, and in response to a short-range wireless message received by the radio module from the electronic device: set the state of the product to: a deactivated state, a locked state, and/or an unlocked state ⎣⌐738

C

C

The state of the product is set by the controller to the unlocked state. The controller is configured to change the state of the product from the unlocked state to the locked state after a predefined time duration ⊢⌐740

C

The state of the product is set by the controller to the unlocked state. The controller is configured to change the state of the product from the unlocked state to the locked state after the product has been used for a predefined number of times ⊢⌐742

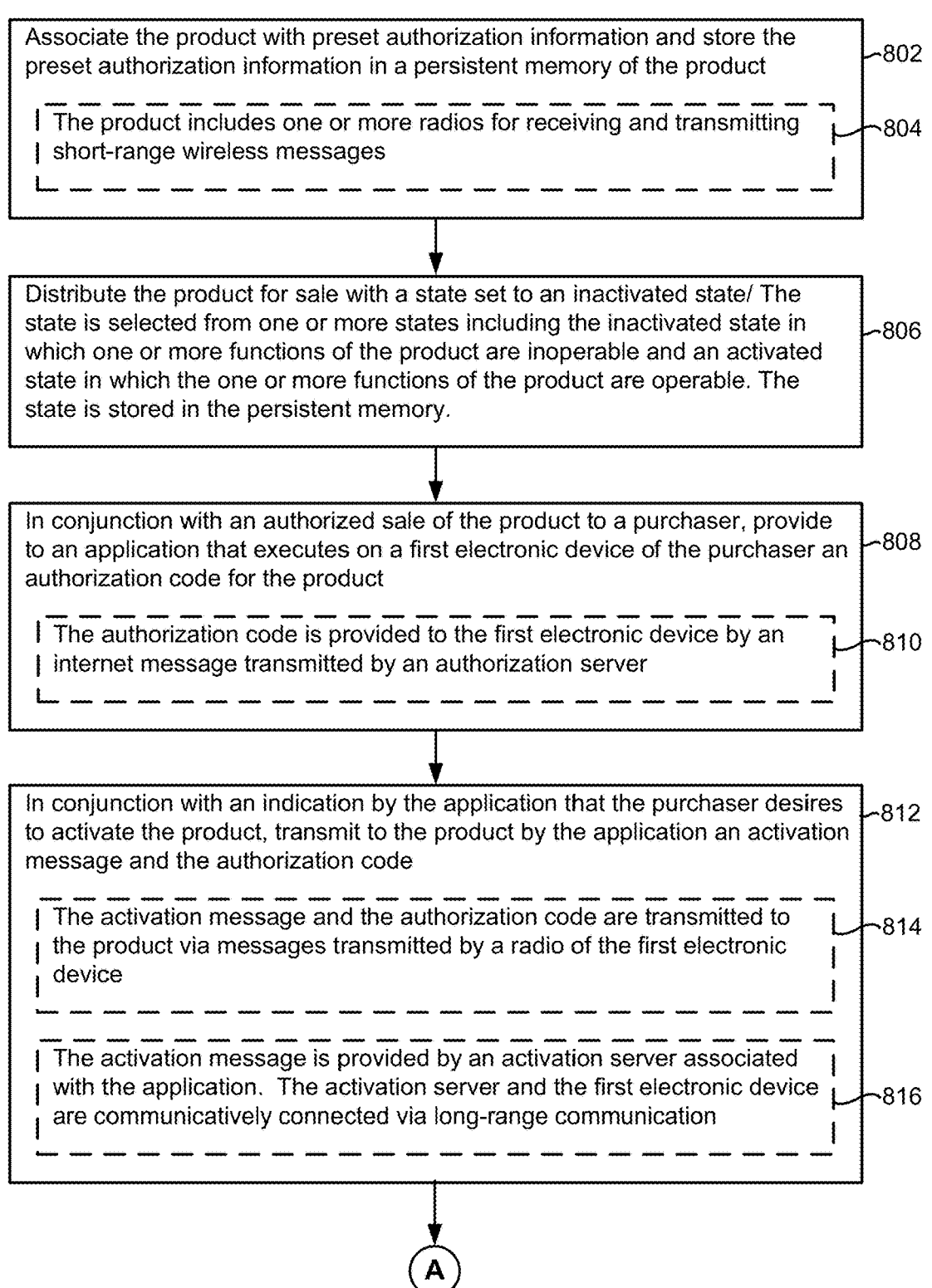

Associate the product with preset authorization information and store the preset authorization information in a persistent memory of the product ⌐802

The product includes one or more radios for receiving and transmitting short-range wireless messages ⌐804

Distribute the product for sale with a state set to an inactivated state/ The state is selected from one or more states including the inactivated state in which one or more functions of the product are inoperable and an activated state in which the one or more functions of the product are operable. The state is stored in the persistent memory. ⌐806

In conjunction with an authorized sale of the product to a purchaser, provide to an application that executes on a first electronic device of the purchaser an authorization code for the product ⌐808

The authorization code is provided to the first electronic device by an internet message transmitted by an authorization server ⌐810

In conjunction with an indication by the application that the purchaser desires to activate the product, transmit to the product by the application an activation message and the authorization code ⌐812

The activation message and the authorization code are transmitted to the product via messages transmitted by a radio of the first electronic device ⌐814

The activation message is provided by an activation server associated with the application. The activation server and the first electronic device are communicatively connected via long-range communication ⌐816

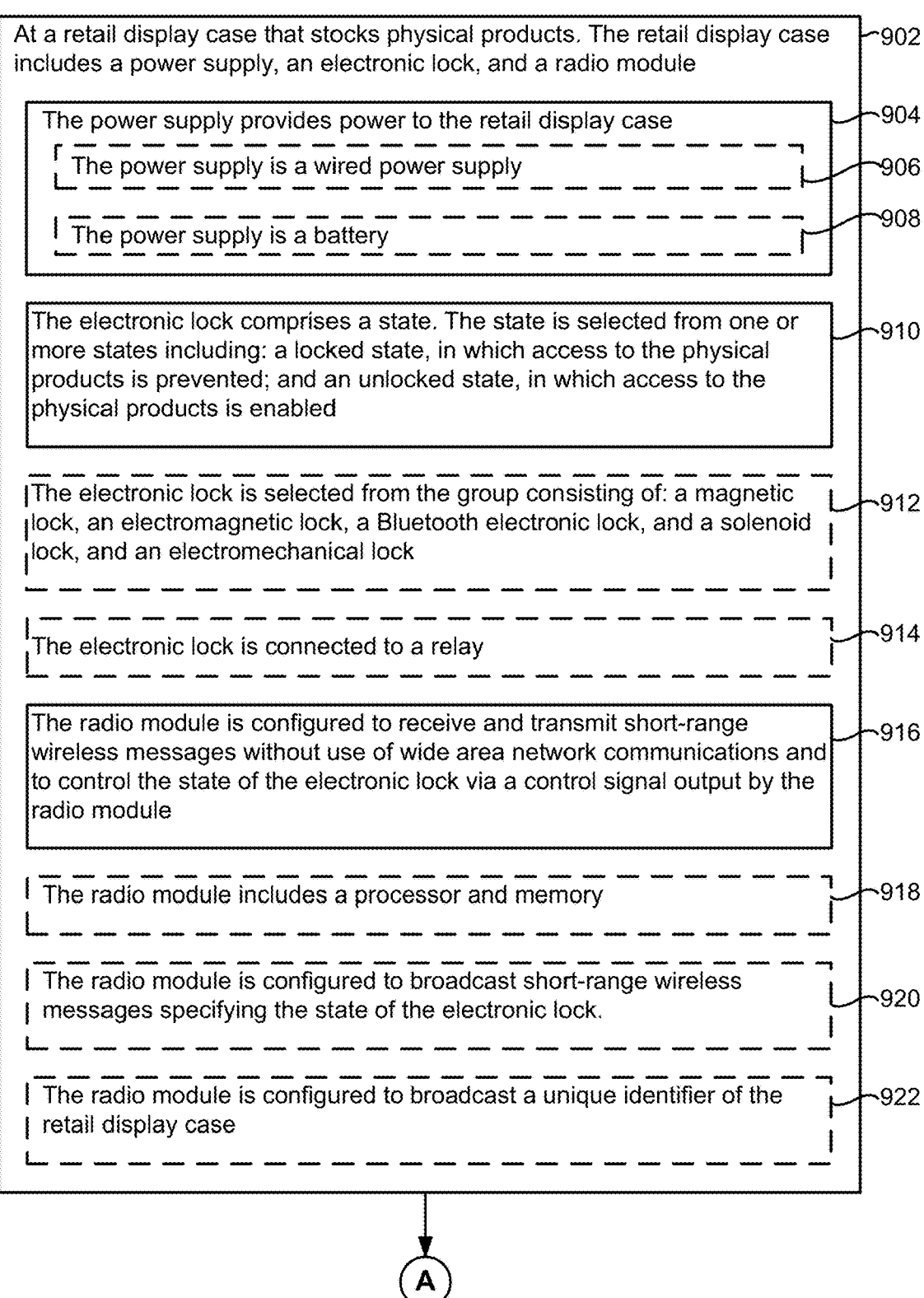

At a retail display case that stocks physical products. The retail display case includes a power supply, an electronic lock, and a radio module    ⌐902

The power supply provides power to the retail display case    ⌐904

The power supply is a wired power supply    ⌐906

The power supply is a battery    ⌐908

The electronic lock comprises a state. The state is selected from one or more states including: a locked state, in which access to the physical products is prevented; and an unlocked state, in which access to the physical products is enabled    ⌐910

The electronic lock is selected from the group consisting of: a magnetic lock, an electromagnetic lock, a Bluetooth electronic lock, and a solenoid lock, and an electromechanical lock    ⌐912

The electronic lock is connected to a relay    ⌐914

The radio module is configured to receive and transmit short-range wireless messages without use of wide area network communications and to control the state of the electronic lock via a control signal output by the radio module    ⌐916

The radio module includes a processor and memory    ⌐918

The radio module is configured to broadcast short-range wireless messages specifying the state of the electronic lock.    ⌐920

The radio module is configured to broadcast a unique identifier of the retail display case    ⌐922

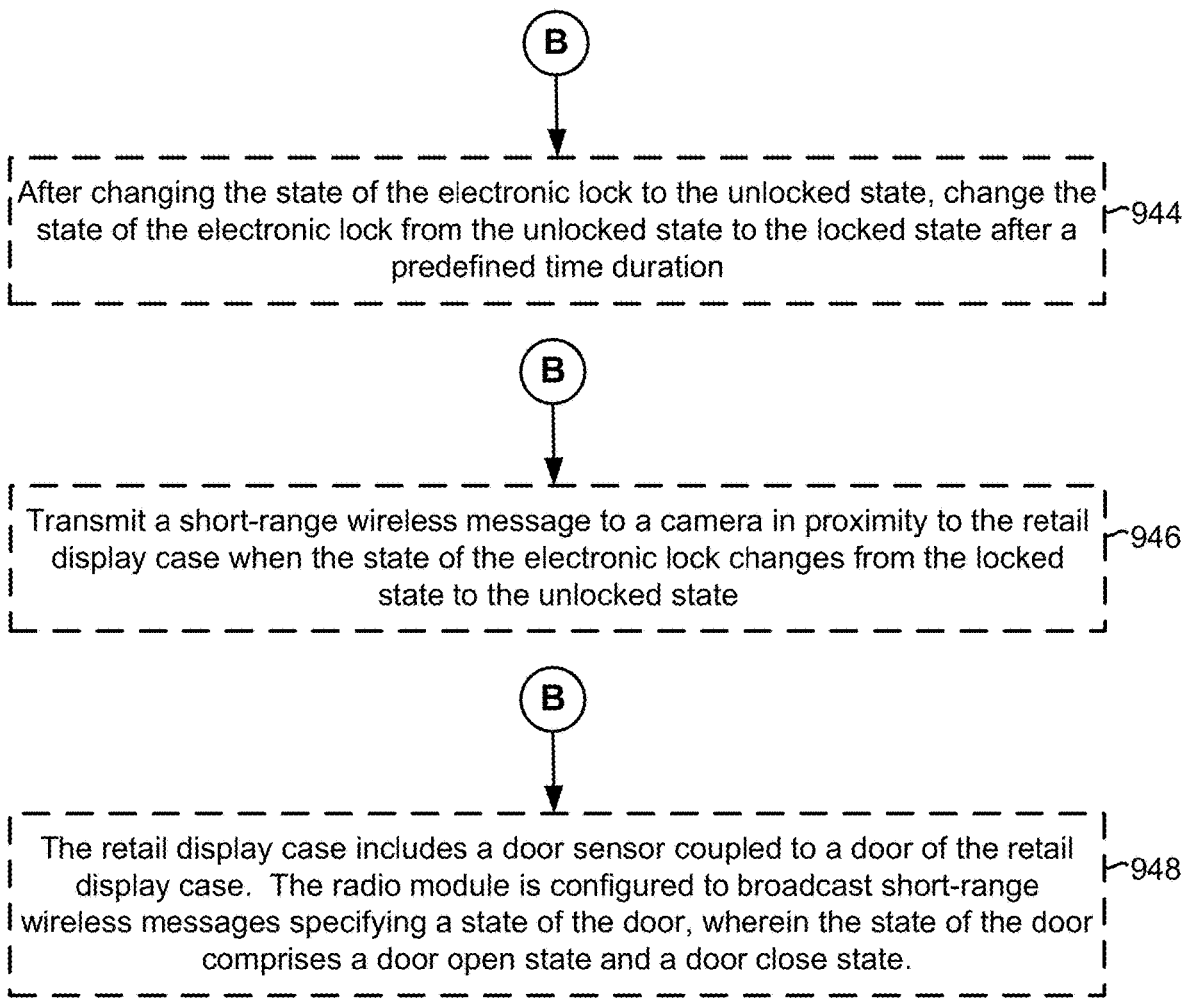

After changing the state of the electronic lock to the unlocked state, change the state of the electronic lock from the unlocked state to the locked state after a predefined time duration —944

Transmit a short-range wireless message to a camera in proximity to the retail display case when the state of the electronic lock changes from the locked state to the unlocked state —946

The retail display case includes a door sensor coupled to a door of the retail display case. The radio module is configured to broadcast short-range wireless messages specifying a state of the door, wherein the state of the door comprises a door open state and a door close state. —948

SYSTEMS AND METHODS FOR TOOL ACTIVATION AND DISPLAY CABINET LOCKING

PRIORITY CLAIM AND RELATED APPLICATIONS

This application claims priority to U.S. Provisional Patent Application No. 63/620,674 (filed Jan. 12, 2024), which is hereby incorporated by reference in its entirety. This application is also a continuation-in-part of U.S. patent application Ser. No. 18/610,033 (filed Mar. 19, 2024), which is a continuation of U.S. patent application Ser. No. 17/443,802 (filed Jul. 27, 2021), which is a continuation of U.S. patent application Ser. No. 16/934,933 (filed Jul. 21, 2020), each of which is hereby incorporated by reference in its entirety.

This application is related to U.S. patent application Ser. No. 18/643,965 (filed Apr. 23, 2024), Ser. No. 18/952,804 (filed Nov. 19, 2024), Ser. No. 18/888,102 (filed Sep. 17, 2024), Ser. No. 18/830,424 (filed Sep. 10, 2024), Ser. No. 18/952,778 (filed Nov. 19, 2024), Ser. No. 18/951,218 (filed Nov. 18, 2024), Ser. No. 18/197,070 (filed May 14, 2023), Ser. No. 18/197,071 (filed May 14, 2023), Ser. No. 18/643,979 (filed Apr. 23, 2024), Ser. No. 18/888,036 (filed Sep. 17, 2024), and Ser. No. 18/636,314 (filed Apr. 16, 2024), each of which is hereby incorporated by reference in its entirety.

TECHNICAL FIELD

The present application relates to the field of tool activation and cabinet locking.

BACKGROUND

Retail theft is a large and growing problem accounting for over $100 billion in annual losses for US retailers in 2022 as stated by the National Retail Federation. Certain categories of products (e.g., articles of manufacture), such as power tools, represent a large portion of the losses due to the high value of the products combined with relatively easy approaches to resell stolen goods through e-commerce. Left with few options, retailers lock up high-theft items behind cases or cages, but this impacts legitimate consumer shopping experiences, increases retailer costs due to added labor, and decreases overall sales due to the significant consumer inconvenience.

SUMMARY

The present disclosure provides technical solutions to combat the problem of retail theft or after-purchase theft of valuable products (e.g., job-site theft of power tools).

One aspect of the present disclosure describes systems, devices, and methods that leverage short-range communication (e.g., Bluetooth) technology to embed controls into a product that render the product inoperable until the product has been activated (see, e.g., FIG. 1). The activation can be persistent or temporary (e.g., time-based for rentals). A product with persistent activation can subsequently be deactivated, for example, if the product was stolen. In some implementations, after the product has been activated, the product can be assigned to an owner (e.g., bound to a user account of a mobile application that is used to activate the product), who can lock or unlock the product at the owner's discretion. The product activation process disclosed herein does not prevent legitimate resale of the product, as the owner can de-assign the product from the owner's account and re-assign the product to another user account.

One aspect of the present disclosure describes systems, devices, and methods that leverage short-range communication (e.g., Bluetooth) technology to embed controls into an offline display case (e.g., display cabinet) that stocks products in a retail store. In some implementations, the controls that are embedded in the offline display case comprise controls that are integrated into a customized retail display case (see, e.g., FIG. 4) that is connected to a power supply and an electronic lock that is in a locked state (i.e., the display case is locked by default). When a user with a mobile device executing an application wants to retrieve a product from the display case, the embedded controls determine whether a user account of the application executing on the mobile device is a trusted (or authorized) account. When the embedded controls determine that the user account is a trusted account, the electronic lock changes from a locked state to an unlocked state (e.g., the retail case unlocks automatically, without user intervention) and the user may retrieve the product from the display case without having to ask a store attendant for help. In some implementations, the display case is equipped with a timer that changes the state of the lock from the unlocked state to the locked state after a predefined time period. In some implementations, the display case includes a door sensor that detects whether a door of the display case is open or close. In some implementations, the display case is configured to broadcast a status of the electronic lock and/or the cabinet door. In some implementations, the door unlocks and automatically opens and closes. In another aspect, the controls that are embedded in the offline display case comprise a display case control system (see, e.g., FIG. 5) that is installed on an existing piece of display case furniture, such as a display case that is currently used in a retail store. In some implementations, the display case is communicatively connected with a security camera system. The security system can be configured to trigger or tag the recording of the display case vicinity whenever a user is engaging with the electronic locking system of the display case. In some implementation, the display case is unlocked through a payment initiated through the user's mobile device.

The subject matter described herein is particularly pointed out and distinctly claimed in the concluding portion of this specification. Objectives, features, combinations, and advantages described and implied herein will be more readily understood upon consideration of the following detailed description of the invention, taken in conjunction with the accompanying drawings.

BRIEF DESCRIPTION OF THE DRAWINGS

For a better understanding of the various described implementations, reference should be made to the Detailed Description below, in conjunction with the following drawings. Like reference numerals refer to corresponding parts throughout the drawings.

FIGS. 7A-7C illustrate a flowchart diagram of method for activating a product in accordance with some implementations.

FIGS. 8A-8B illustrate a flowchart diagram of method for activating a product in accordance with some implementations.

FIGS. 9A-9C illustrate a flowchart diagram of method for unlocking an offline retail display case that stocks physical products, in accordance with some implementations.

DETAILED DESCRIPTION

Figure 1:
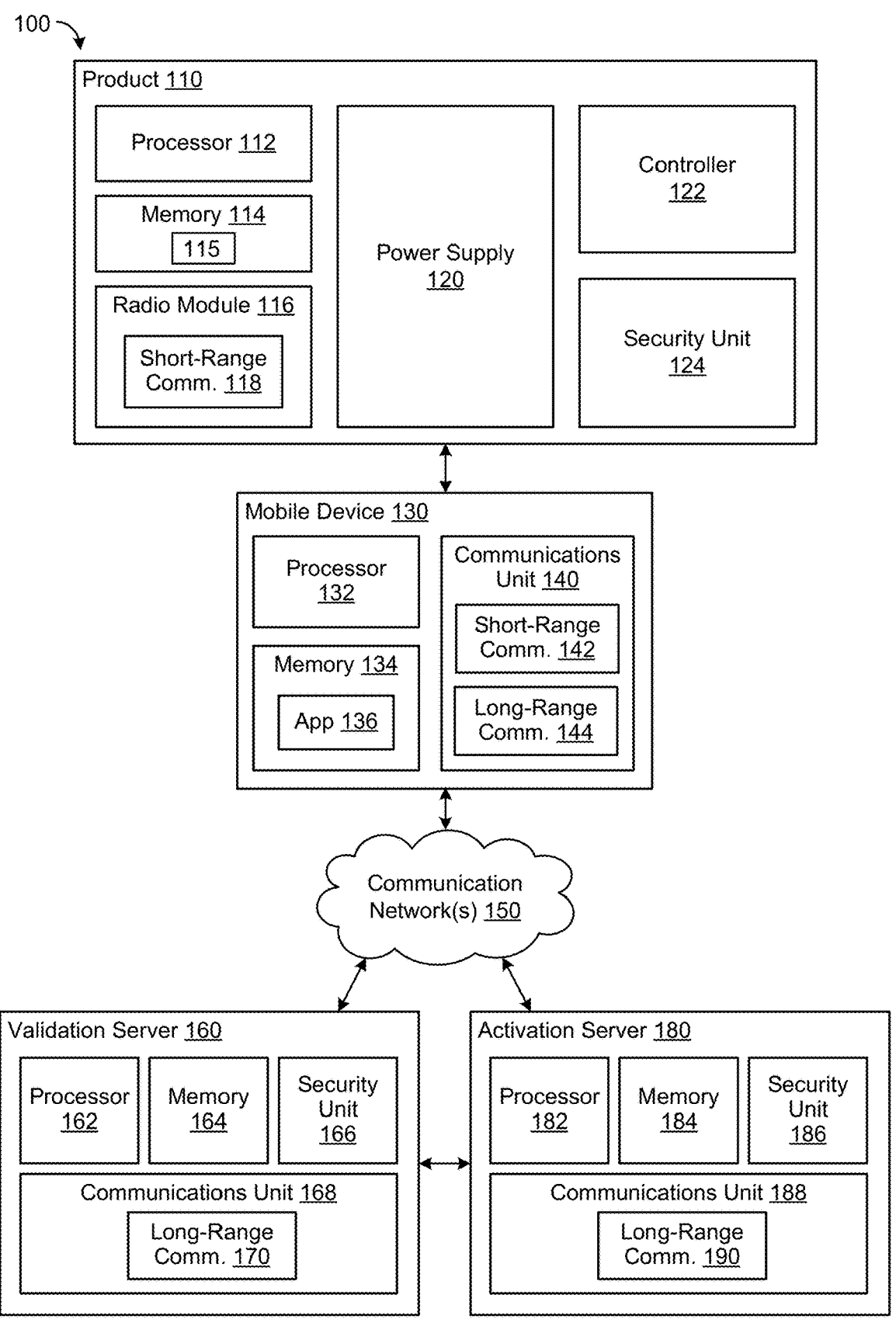
FIG. 1 is a block diagram of a product validation and activation system in accordance with some implementations.

FIG. 1 is a block diagram of a product validation and activation system 100 in accordance with some implementations. The validation and activation system 100 includes a product 110, a mobile device 130, one or more communication networks 150, a validation server 160, and an activation server 180.

In some implementations, the product 110 is a tool, a toy, an electronic device, or other product that may be susceptible to theft, including retail theft and after-purchase theft. In some implementations, the product 110 is not capable of being connected to the internet. In some implementations, the product 110 is capable of being connected to the internet but does not require this capability in the product activation processes disclosed herein.

The product 110 includes one or more processors 112, memory 114 that is coupled to an optional controller 122, a radio module 116, and a power supply 120. The memory 114 includes persistent memory 115 that stores preset authorization information. In some implementations, the controller 122 controls operation of the product 110, and the processor 112 controls operations of the radio module 116. In some implementations, the controller 122 sets a state (e.g., a current state) of the product. In some implementations, the controller 122 stores a state (e.g., a current state) of the product in the persistent memory 115. In some implementations, the controller 122 and/or the processor 112 are part of the radio module 116. In some implementations, the controller 122 and/or the processor 112 are separate controller/processing modules. In some implementations, some functions of the controller 122 and/or the processor 112 are performed by a controller/processing module embedded in the radio module 116, and some functions of the controller 122 and/or the processor 112 are performed in a separate controller/processing module.

The persistent memory 115 retains stored information even in the absence of power being provided by the power supply 120. The power supply 120 can be a battery pack (e.g., a swappable battery pack for a cordless power tool) or an internal battery or other internal power supply that is capable of providing power to the product without the product being connected to an external power supply. In some implementations, the product 110 includes a security unit 124 for encrypting or decrypting messages.

The radio module 116 includes short-range communication capability 118. In some implementations, the radio module 116 includes a processor and memory. In some implementations, the radio module 116 performs the controller functions. In some implementations, the product 110 only has the radio module 116 including short-range communication capability 118 and controller 122 (e.g., in a system-on-chip (SOC) implementation). In some implementations, the radio module 116 does not use or require a separate controller. In some implementations, the radio module 116, the processor(s) 112, the controller 122, the memory 114 (and persistent memory 115), and the security unit 124 are all part of an SOC implementation (e.g., an all-in-one unit).

The security unit 124 may encrypt and decrypt messages between the product 110 and the validation and activation servers 160 and 180 using a unique private key, public/private keys (i.e., asymmetric cryptography), or other encryption/decryption strategies known or yet to be discovered. For example, a unique private key may be used to securely transmit encrypted messages between the product 110 and activation server 180 (although the encrypted transmissions would most likely be routed through the mobile device 130). The server 180 stores a private key for each product 110, and this key is only known to the product 110 and the server 180. No intermediary is privy to this key (especially not the mobile device 130). When the product 110 and the server 180 communicate messages (e.g., authorization request and authorization grant messages), the security unit 124 of the product 110 encrypts the message with its private key and passes the message to the mobile device 130. The mobile device 130 (which preferably cannot decrypt the message) passes the encrypted message to the server 180. The security unit 186 of the server 180 is able to decrypt the message using the unique private key. The security unit 186 of the server 180 uses this same unique private key to encrypt messages to the product 110 and sends the message to the mobile device 130 to relay to the product 110, which is able to decrypt the message using the security unit 124 and the unique private key. The product 110 may also communicate with the security unit 166 of the validation server 160 using encryption and decryption as described in the example above. The security unit 124 may be a module in memory 114 or a separate security module, configured to cause the processor 112 to implement the encryption and decryption functions described herein.

In some implementations, the processor(s) 112, the memory 114, the radio module 116, and the security module 124 are part of an adapter module corresponding to adapter module 100 described in any of the applications incorporated by reference in paragraphs [0001]-[0002] above (e.g., adapter module 100 described in FIGS. 1-30 and corresponding disclosure of U.S. patent application Ser. No. 18/830,424, and/or adapter module 100 described in FIGS. 1-35B and corresponding disclosure of U.S. patent application Ser. No. 18/610,033), the operations of which are not repeated here for the sake of brevity.

The validation server 160 includes one or more processors 162, memory 164, and a communications unit 168. The communications unit 168 of the validation server 160 includes long-range communication capability 170 (e.g., cellular technology and/or Wi-Fi mechanisms). The validation server 160 also includes a security unit 166 for encrypting and decrypting messages. The security unit 166 may be a module in memory 164 or a separate security module, configured to cause the processor 162 to implement the encryption and decryption functions described herein. The functions of the validation server 160 are described below with reference to FIGS. 2 and 3A-3B.

The activation server 180 includes one or more processors 182, memory 184, and a communications unit 188. The communications unit 188 of the activation server 180 includes long-range communication capability 190 (e.g., cellular technology and/or Wi-Fi mechanisms). The validation server 180 also includes a security unit 186 for encrypting and decrypting messages. The security unit 186 may be a module in memory 184 or a separate security module, configured to cause the processor 182 to implement the encryption and decryption functions described herein. The functions of the validation server 180 are described below with reference to FIGS. 2 and 3A-3B.

In some implementations, the validation server 160 and the activation server 180 are part of the same server system. In some implementations, the validation server 160 and the activation server 180 are distinct server systems. In some implementations, validation server functions are managed, configured, and/or specified by a third party that provides product validation services for OEMs (original equipment manufacturers) and retailers, and the activation server functions are managed, configured, and/or specified by one or more OEMs with respect to protected products manufactured by respective OEMs.

In some implementations, the validation server 160 and/or the activation server 180 correspond to server 130 described in any of the applications incorporated by reference in paragraphs [0001]-[0002] above (e.g., server 130 described in FIGS. 1-30 and corresponding disclosure of U.S. patent application Ser. No. 18/830,424, and/or server 130 described in FIGS. 1-35B and corresponding disclosure of U.S. patent application Ser. No. 18/610,033), the operations of which are not repeated here for the sake of brevity.

The mobile device 130 may be a user's personal mobile device 130. The mobile device 130 (with a processor 132 and a mobile application 136 stored in a memory 134) acts as a communication bridge between the product 110 and the validation and activation servers 160 and 180. The mobile device 130 and the application 136, however, are not "trusted" in that the communications (transmissions) they pass are encrypted. Encrypted (secured) communications are undecipherable (unencryptable, unreadable, and/or unusable) by the mobile device 130. This keeps the communications passed between the product 110 and the servers 160 and 180 secured and safe from hacking. Mobile devices include, but are not limited to smart phones, tablet or laptop computers, personal digital assistants (PDAs), smart cards, or other technology (e.g., a hardware-software combination) known or yet to be discovered that has structure and/or capabilities similar to the mobile devices described herein. The mobile device 130 preferably has an application (e.g., the application 136) running on it. The term "app" is used broadly to include any software program(s) capable of implementing the features described herein. The phrase "mobile device" can be assumed to include the relevant app unless specifically stated otherwise. Similarly, an "app" can be assumed to be running on an associated mobile device unless specifically stated otherwise. The mobile device 130 includes a communications unit 140, which includes mechanisms for both long-range communications (shown as the long-range communication capability 144 such as cellular, Wi-Fi, and/or other similar communication mechanisms) for communicating with the servers 160 and 180 and short-range communications (shown as the short-range communication capability 142 such as Bluetooth and/or other similar communication mechanisms) for communicating with the product 110.

The mobile device 130 and servers 160 and 180 are communicatively coupled to each other by one or more communication networks 150. The communication network(s) 150 are configured to convey communications (messages, signals, transmissions, and so forth). The communications include various types of information and/or instructions including, but not limited to, data, commands, bits, symbols, voltages, currents, electromagnetic waves, magnetic fields or particles, optical fields or particles, and/or any combination thereof. The communication network(s) 150 use one or more communication protocols, such as any of Wi-Fi, Bluetooth, Bluetooth Low Energy (BLE), near-field communication (NFC), ultra-wideband (UWB), radio frequency identification (RFID), infrared wireless, induction wireless, ZigBee, Z-Wave, 6LoWPAN, Thread, 4G, 5G, and the like. Such protocols may be used to send and receive the communications using one or more transmitters, receivers, or transceivers. For example, hard-wired communications (e.g., wired serial communications) may use technology appropriate for hard-wired communications, short-range communications (e.g., Bluetooth) may use technology appropriate for close communications, and long-range communications (e.g., GSM, CDMA, Wi-Fi, wide area network (WAN), local area network (LAN), or the like) may use technology appropriate for remote communications over a distance (e.g., over the Internet). In general, the communication network(s) 150 may include or otherwise use any wired or wireless communication technology that is known or yet to be discovered.

Figure 2:
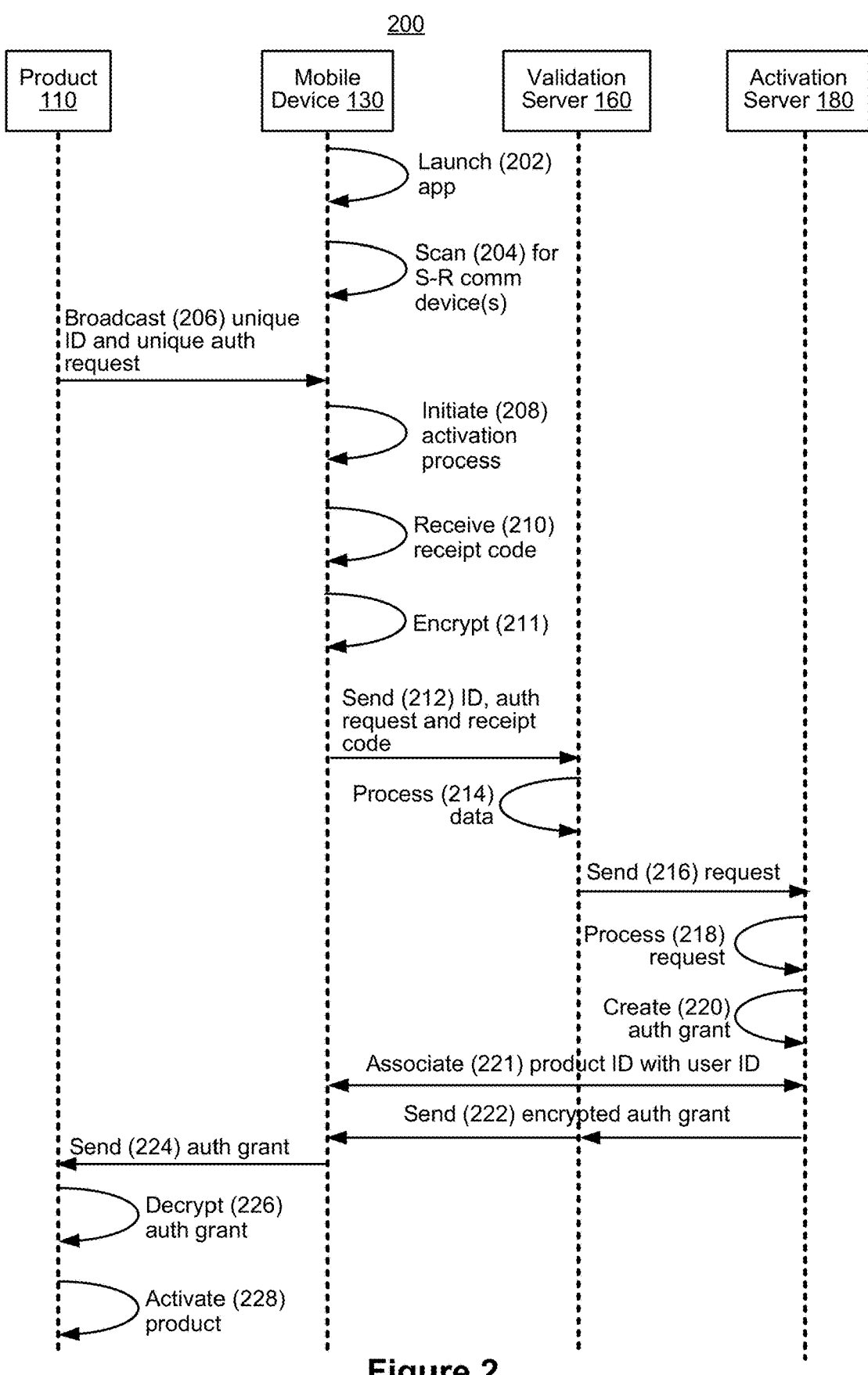
FIG. 2 is a schematic flow diagram of a process for activating a product in accordance with some implementations.

FIG. 2 is a schematic flow diagram of a process 200 for activating a product 110 in accordance with some implementations. In accordance with some implementations of the present disclosure, products stocked in a retail store (e.g., a physical store or an online store) are in an inactivated state. An "inactivated" product is one that is non-functional (or non-operational) even though it is connected to a power supply and turned on. A consumer (e.g., associated with a mobile device 130) purchases a product through a retail point of sales (POS) or via an online e-commerce transaction. When the consumer is ready to activate the product, the purchase must be validated (e.g., by a server system) before the product can be activated.

In some implementations, the process 200 executes on a product 110, a mobile device 130 (e.g., associated with a respective consumer and executing the application 136 thereon, or an application that is associated with a manufacturer of the product, or an application that is associated with the retail store), a validation server 160, and an activation server 180.

The mobile device 130 launches (202) the application 136. The mobile device 130 scans (204), using short-range communication capability 142 of the communications unit 140, for a short-range communication device such as a Bluetooth device (e.g., radio module 116 or an adapter module) which is in the product 110.

The product 110 broadcasts (206), using short-range communication capability 118, a unique identifier for the product 110 (e.g., serial number) along with a unique authorization (auth) request. The mobile device 130 receives the unique identifier for the product 110 and the auth request via short-range communication capability 142. In some implementations, the broadcast may include the current state of the electronic lock (e.g., locked or unlocked), and/or the status of a door (e.g., open or closed) of a display case in which the product 110 is located. In some implementations, as an alternative to the scanning (204) and broadcasting (206) steps, a user may provide the unique ID to the application 136 by, for example, scanning a barcode or a QR code that is printed on the product 110 or manually entering the unique ID.

The mobile device 130 initiates (208) (e.g., via the user or consumer) an activation process using the application 136.

The mobile device 130 receives (210) a receipt code. For example, the mobile device 130 prompts the user to scan, using the mobile device 130, a barcode or a QR code that is printed on the purchase receipt or manually enter the receipt code.

The mobile device 130 encrypts (211) the unique product ID, the unique auth code, and the receipt code with the key for the mobile device.

The mobile device 130 sends (212), via the long-range communication capability 144, the unique identifier for the product and the auth request (that the mobile device 130 received from the product 110) along with the receipt code to the validation server 160 (or validation service). The unique identifier for the product, the auth request, and the receipt code are encrypted with the key for the mobile device 130.

The validation server 160 processes (214) the received data. In some implementations, the validation server 160 confirms, in accordance with the processing, that the receipt code is valid (e.g., the product 110 has been paid and not returned, or the receipt code has not previously been used in excess of the times permitted (e.g., one time)). In some implementations, the validation server 160 may call (communicate with) an external server/service (e.g., the retailer's server system) to verify the receipt and/or payment.

The validation server 160 sends (216) a request to the activation server 180.

The activation server 180 processes (218) the request from the validation server 160. In some implementations, the activation server creates (220) an auth grant which contains the auth request and encrypts the message (e.g., using security unit 186) with an encryption key unique to the product 110.

The activation server 180 associates (221) the product corresponding to the unique ID to the user account of the mobile application 136 that transmitted the auth request and receipt code in step 212.

The activation server 180 sends (222) (e.g., returns) the encrypted auth grant. In some implementations, the activation server 180 sends the encrypted auth grant directly to the mobile device 130. In some implementations, the activation server 180 sends the encrypted auth grant to the validation server 160, which then sends it to the mobile device 130.

The mobile device 130 establishes a connection with the product 110 and sends (224) the auth grant to the product 110.

The product 110 decrypts (226) the auth grant (e.g., using security unit 124) with its encryption key and validates that the auth request is valid (e.g., the auth request was issued by the product 110, the auth request was returned within a predefined amount of time, and has not been previously used). Once the validation is successful, the controller 122 changes (228) the state of the product from the inactivated state to an activated state, thus allowing the product to be used. In some implementations, activating the product (e.g., changing from the inactivated state to the activated state) includes setting by the controller 122 a flag 115 in the persistent memory 114 such that once the product 110 is activated, the activation process need not happen again.

In some implementations, there is a similar flow to deactivate the product (in which case the flag 115 gets unset).

In some implementations, the product activation can be set for a specific time period (e.g., 24 hours or 48 hours). The product 110 (e.g., via controller 122) can keep track of time and unset the activation flag when the time has expired.

In some implementations, the verification server 160 and activation server 180 are the same server. In some implementations the verification server 160 and activation server 180 are distinct servers. In some cases, the servers are services. In some implementations, the validation server 160 functions are managed, configured, and/or specified by a third party that provides product validation services for OEMs (original equipment manufacturers) and retailers, and the activation server 180 functions are managed, configured and/or specified by one or more OEMs with respect to protected products manufactured by respective OEMs.

In some implementations, the product 110 may broadcast (e.g., transmit) additional information such as battery status, run-time and usage data, device health, and/or error codes to the mobile device 130 via the short-range communication capability 118.

In some implementations, payment for the product 110 is made using the mobile device 130 (e.g., via application 136) and the activation process 200 is initiated when the payment is completed.

In some implementations, the retail store that sells the product 110 can activate the product 110 using its own device 130. For example, the retail store can have a POS (e.g., cash register) that executes the verification and activation process (one or more of steps 202-226) and sends the activation (228) to the product 110 during the checkout process.

In some implementations, the retail store may provide an override code instead of the receipt code.

In some implementations, the retail store may use its own mobile device 130 to request activation of the product 110 without going through the verification server 160 (e.g., the mobile device 130 of the retail store bypasses verification and proceeds straight to activation).

In some implementations, the same receipt code can be used multiple times (e.g., when multiple products are purchased as part of the same transaction).

In some implementations, the activation process that is described with reference to FIG. 2 can be passed onto different products 110 (e.g., a first product 110-1 and a second product 110-2). For example, a consumer may have a tool set that includes a first tool (e.g., a drill), a second tool (e.g., a circular saw), and a third tool (e.g., a reciprocating saw), but the activation process only allows for one tool to be used at any time. In this instance, the consumer can deactivate the first tool and activate the second tool after the first tool has been deactivated. In each case, a deactivation flow and an activation flow may be followed.

In some implementations, the activation message can include grants of additional features or capabilities. Using a power drill as an example product, in some instances, the drill can receive a message to upgrade it (unlock features) from a single- or two-speed drill into a variable speed drill.

In some implementations, the product activation process requires identity verification from a user of the mobile device 130.

Figure 3A:
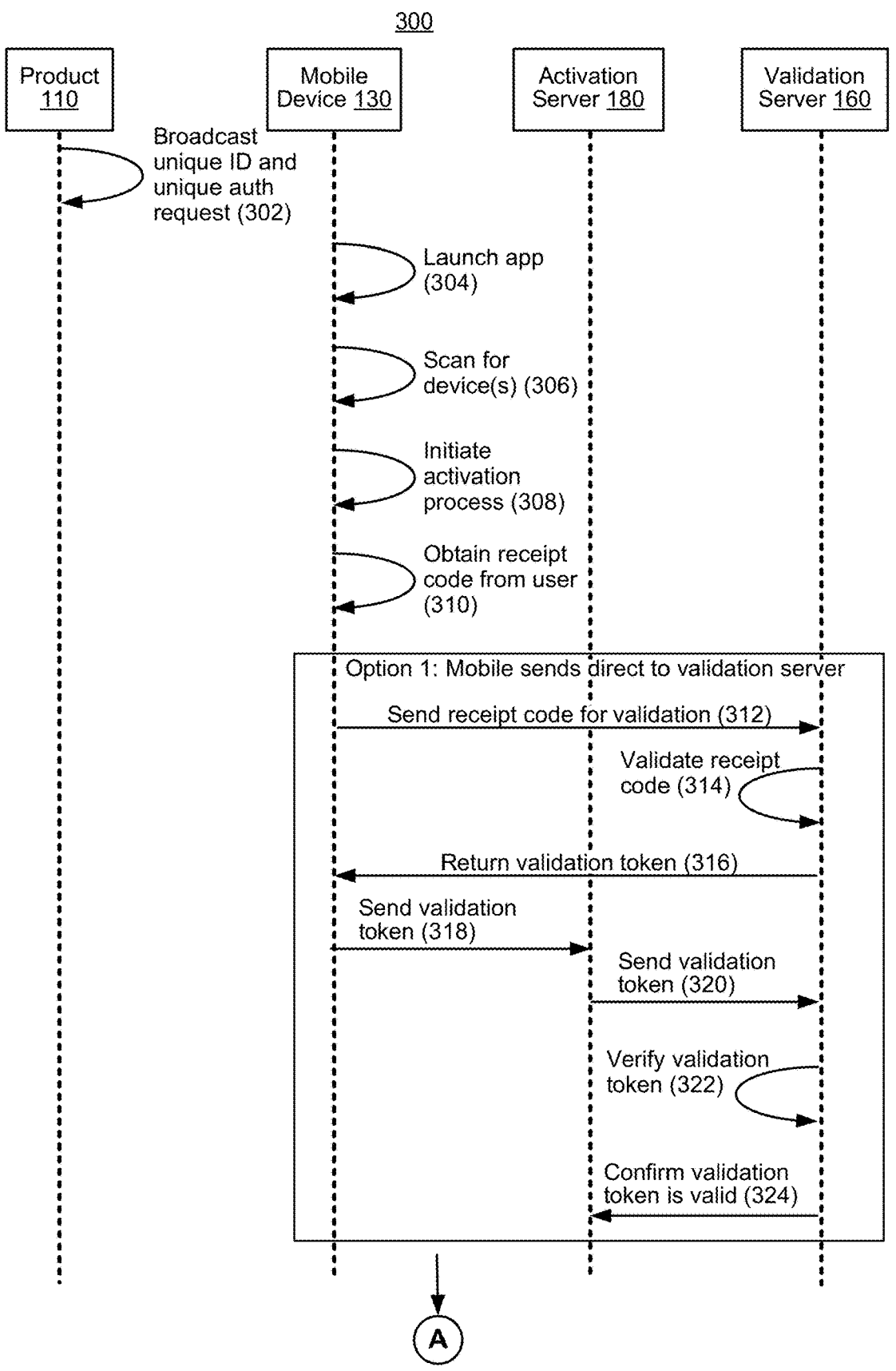
FIGS. 3A-3B are schematic flow diagrams of a process for activating a product in accordance with some implementations.
Figure 3B:
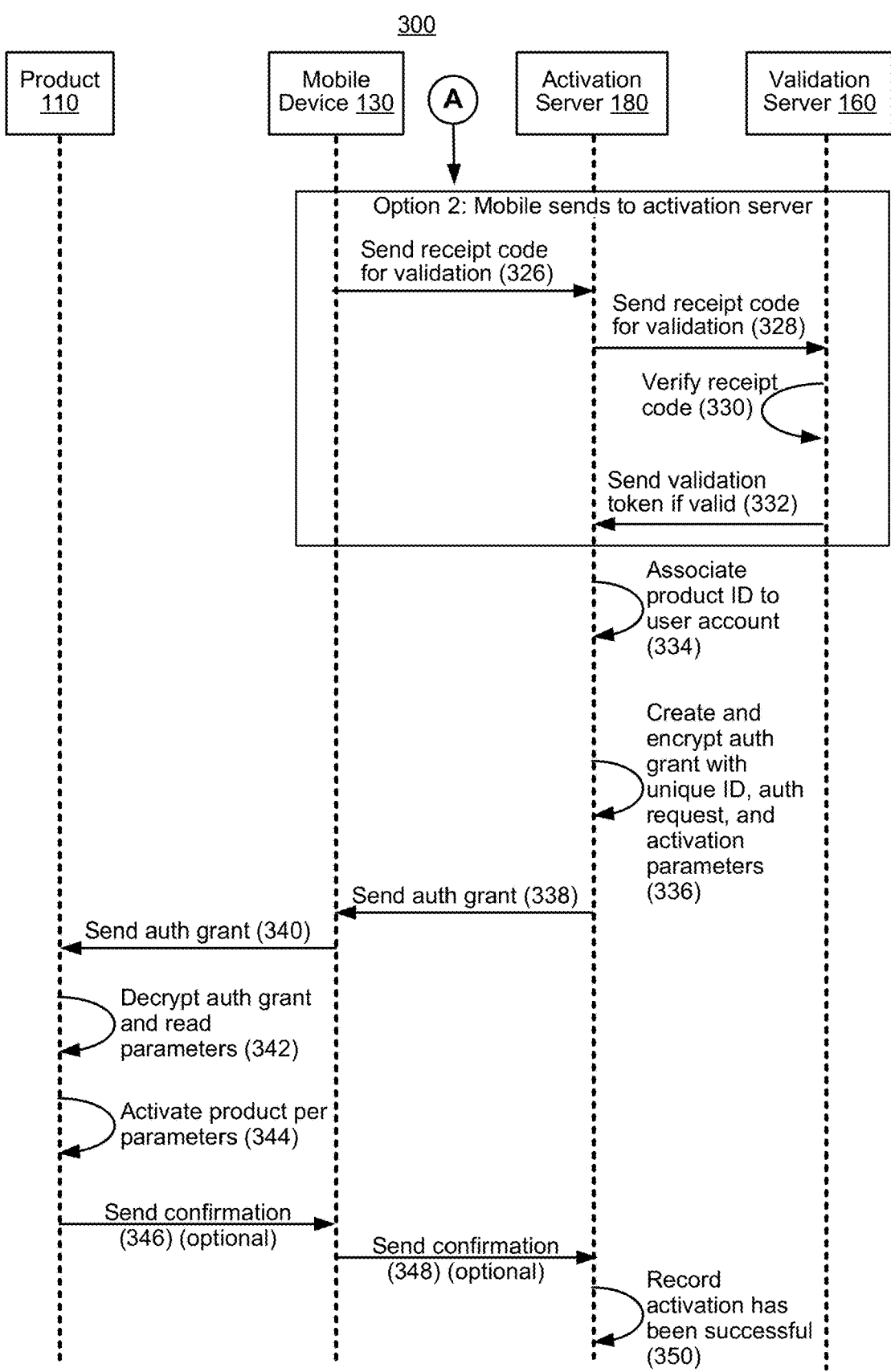

FIGS. 3A-3B are a schematic flow diagram of a process 300 for activating a product in accordance with some implementations. In some implementations, some of the steps described in FIGS. 3A-3B can be used in combination with some of the steps described in FIG. 2.

In some implementations, the process 300 executes on a product 110, a mobile device 130 (e.g., associated with a respective consumer and executing the application 136 thereon, or an application that is associated with a manufacturer of the product, or an application that is associated with the retail store), a validation server 160, and an activation server 180.

The product 110 broadcasts (302) a unique ID and a unique auth request. The mobile device 130 launches (304) application 136 and scans (306) for devices (e.g., similar to steps 202-204 in FIG. 2). The mobile device 130 initiates (308) an activation process and obtains (310) a receipt code (e.g., similar to steps 208-210 in FIG. 2). The method proceeds with one of two alternative process flows: Option 1 (steps 312-324) or Option 2 (steps 326-332).

In the Option 1 process flow, the mobile device 130 sends data directly to the validation server 160. Specifically, the mobile device 130 sends (312) the receipt code to the validation server 160 for validation, and the validation server 160 verifies (314) the receipt code. Upon validating the receipt code, the validation server 160 returns (316) a validation token to the mobile device 130, which sends (318) a validation token to the activation server 180. The activation server 180 sends (320) the validation token to the validation server 160, which then verifies (322) the validation token, and sends (324) confirmation to the activation server 180 that the validation token is valid.

In the Option 2 process flow, the mobile device 130 sends data directly to the activation server 180. Specifically, the mobile device 130 sends (326) the receipt code to the activation server 180, which sends (328) the receipt code to the validation server 160 for validation. The validation server 160 verifies (330) the receipt code and, if valid, sends (332) a validation token to the activation server 180.

After step 324 or 332 (depending on the implementation), the activation server 180 associates (334) a product ID of the product 110 to a user account of the user. The activation server 180 creates and encrypts (336) an auth grant with a unique ID, an auth request, and activation parameters, and sends (338) the auth grant to the mobile device 130, which sends (340) the auth grant to the product 110 (similar to steps 220-224 in FIG. 2). The product 110 decrypts (342) the auth grant, reads the parameters sent with the auth grant, and activates (344) the product in accordance with the parameters (similar to steps 226-228 in FIG. 2).

Optionally, the product 110 sends (346) confirmation that the product has been activated to the mobile device 130, which sends (348) the confirmation to the activation server 180. The activation server 180 then records (350) that the product activation has been successful.

Figure 4:
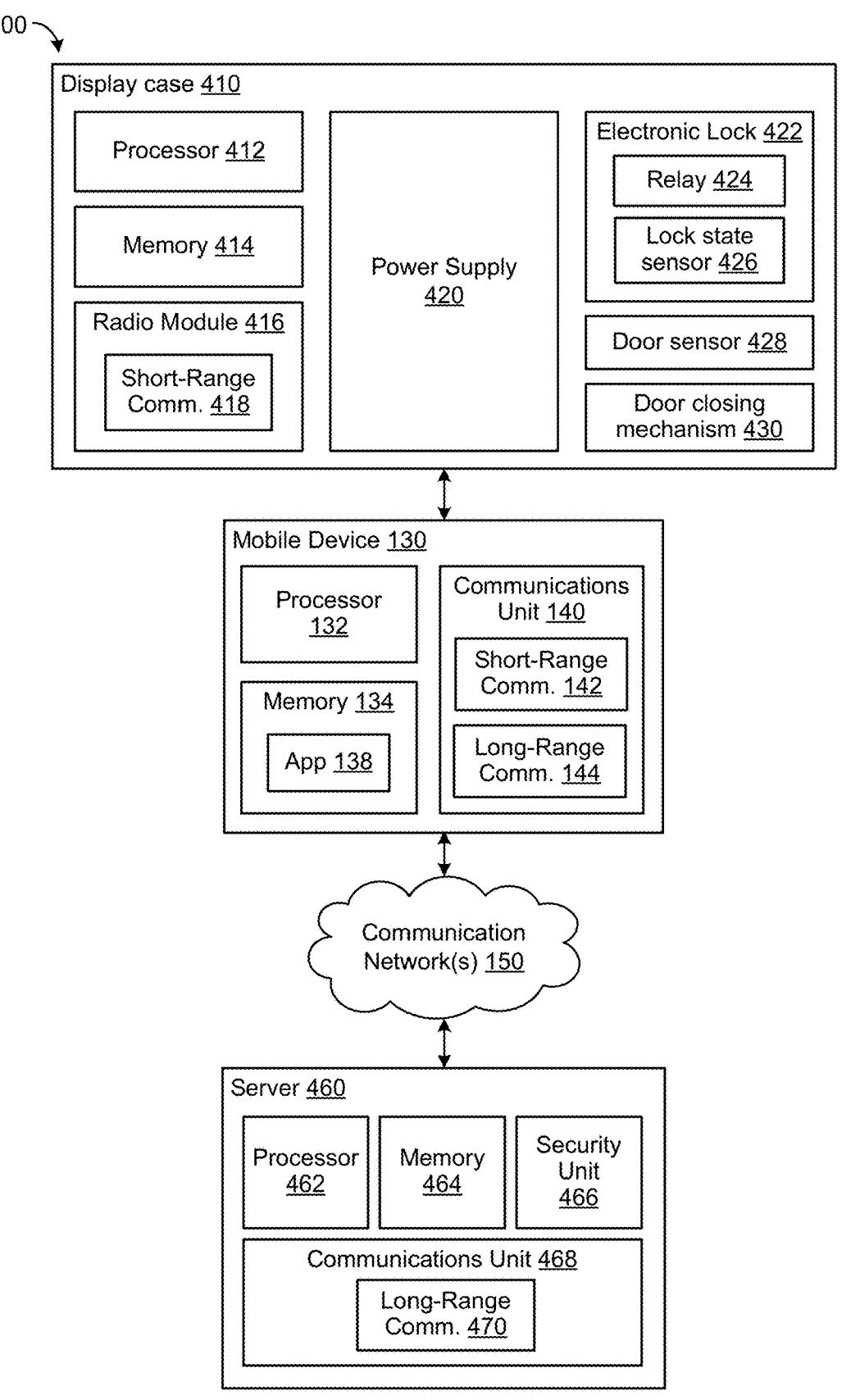
FIG. 4 is a block diagram of a display case security system in accordance with some implementations.

FIG. 4 is a block diagram of a display case security system 400 including a display case 410 configured to communicate with a mobile device 130, and a server 460 in accordance with some implementations.

The display case 410 includes one or more processors 412, memory 414, a radio module 416, and a power supply 420. In some implementations, the processor 412 controls operations of the radio module 116. In some implementations, the processor 412 and/or the memory 414 are part of the radio module 416. In some implementations, the processor 412 is a separate processing module. In some implementations, some functions of the processor 412 are performed by a processing module embedded in the radio module 416, and some functions of the processor 412 are performed in a separate processing module.

The radio module 416 includes short-range communication capability 418. In some implementations, the radio module 416 includes a processor and memory. In some implementations, the radio module 416 performs the processing functions. In some implementations, the display case 410 only has the radio module 416 including short-range communication capability 418 and processor 412 (e.g., in a system-on-chip (SOC) implementation). In some implementations, the radio module 416 does not use or require a separate processor. In some implementations, the radio module 416, the processor(s) 412, and the memory 414 are all part of an SOC implementation (e.g., an all-in-one unit).

In some implementations, the processor(s) 412, the memory 414, and the radio module 416 are part of an adapter module corresponding to adapter module 100 described in any of the applications incorporated by reference in paragraphs [0001]-[0002] above (e.g., adapter module 100 described in FIGS. 1-30 and corresponding disclosure of U.S. patent application Ser. No. 18/830,424, and/or adapter module 100 described in FIGS. 1-35B and corresponding disclosure of U.S. patent application Ser. No. 18/610,033), the operations of which are not repeated here for the sake of brevity.

In some implementations, the display case is connected to a power supply 420. For example, the power supply 420 can be an external power supply with a wired connection to the display case 410 or an internal battery or other internal power supply. In some implementations, the power supply 420 is an external power supply that is used to supply power to light the display case 410.

In some implementations, the display case includes an electronic lock 422 having a relay 424 (e.g., to engage or disengage a bolt or other locking mechanism to lock or unlock an access door of the display case 410) and a lock state sensor 426. The lock state sensor 426 is configured to detect a state (e.g., open or closed) of the electronic lock 422. In some implementations, the display case 410 includes a door sensor 428 that is coupled to a door of the display case 410. The door sensor 428 is configured to detect a state of the door (e.g., open or closed). In some implementations, the display case 410 includes a door closing mechanism 430 that is coupled to the door of the display case 410, configured to facilitate opening and/or closing of the door. For example, in accordance with the door sensor 428 indicating an open state of the door of the display case 410, the door closing mechanism 430 causes the door to close. For example, the door-closing mechanism can include a motor and one or more actuators.

The server 460 includes one or more processors 462, memory 464, and a communications unit 468. The communications unit 468 of the server 460 includes long-range communication capability 470 (e.g., cellular technology and/or Wi-Fi mechanisms). In some implementations, the server 460 includes a security unit 466 for encrypting and decrypting messages. The security unit 466 may be a module in memory 464 or a separate security module, configured to cause the processor 462 to implement the encryption and decryption functions described herein. The functions of the server 460 are described below with reference to FIG. 6.

In some implementations, the server 460 corresponds to server 130 described in any of the applications incorporated by reference in paragraphs [0001]-[0002] above (e.g., server 130 described in FIGS. 1-30 and corresponding disclosure of U.S. patent application Ser. No. 18/830,424, and/or server 130 described in FIGS. 1-35B and corresponding disclosure of U.S. patent application Ser. No. 18/610,033), the operations of which are not repeated here for the sake of brevity.

The mobile device 130 may be a user's personal mobile device 130. The mobile device 130 (with a processor 132 and a mobile application 138 stored in a memory 134) acts as a communication bridge between the display case 410 and the server 460. The mobile device 130 and the application 138, however, are not "trusted" in that the communications (transmissions) they pass are encrypted. Encrypted (secured) communications are undecipherable (unencryptable, unreadable, and/or unusable) by the mobile device 130. This keeps the communications passed between the display case 410 and the server 460 secured and safe from hacking. Mobile devices include, but are not limited to smart phones, tablet or laptop computers, personal digital assistants (PDAs), smart cards, or other technology (e.g., a hardware-software combination) known or yet to be discovered that has structure and/or capabilities similar to the mobile devices described herein. The mobile device 130 preferably has an application (e.g., the application 138) running on it. The term "app" is used broadly to include any software program(s) capable of implementing the features described herein. The phrase "mobile device" can be assumed to include the relevant app unless specifically stated otherwise. Similarly, an "app" can be assumed to be running on an associated mobile device unless specifically stated otherwise. The mobile device 130 includes a communications unit 140, which includes mechanisms for both long-range communications (shown as the long-range communication capability 144 such as cellular, Wi-Fi, and/or other similar communication mechanisms) for communicating with the server 460 and short-range communications (shown as the short-range communication capability 142 such as Bluetooth and/or other similar communication mechanisms) for communicating with the display case 410.

The mobile device 130 and server 460 are communicatively coupled to each other by one or more communication networks 150. The communication network(s) 150 are configured to convey communications (messages, signals, transmissions, and so forth). The communications include various types of information and/or instructions including, but not limited to, data, commands, bits, symbols, voltages, currents, electromagnetic waves, magnetic fields or particles, optical fields or particles, and/or any combination thereof. The communication network(s) 150 use one or more communication protocols, such as any of Wi-Fi, Bluetooth, Bluetooth Low Energy (BLE), near-field communication (NFC), ultra-wideband (UWB), radio frequency identification (RFID), infrared wireless, induction wireless, ZigBee, Z-Wave, 6LoWPAN, Thread, 4G, 5G, and the like. Such protocols may be used to send and receive the communications using one or more transmitters, receivers, or transceivers. For example, hard-wired communications (e.g., wired serial communications) may use technology appropriate for hard-wired communications, short-range communications (e.g., Bluetooth) may use technology appropriate for close communications, and long-range communications (e.g., GSM, CDMA, Wi-Fi, wide area network (WAN), local area network (LAN), or the like) may use technology appropriate for remote communications over a distance (e.g., over the Internet). In general, the communication network(s) 150 may include or otherwise use any wired or wireless communication technology that is known or yet to be discovered.

Figure 5:
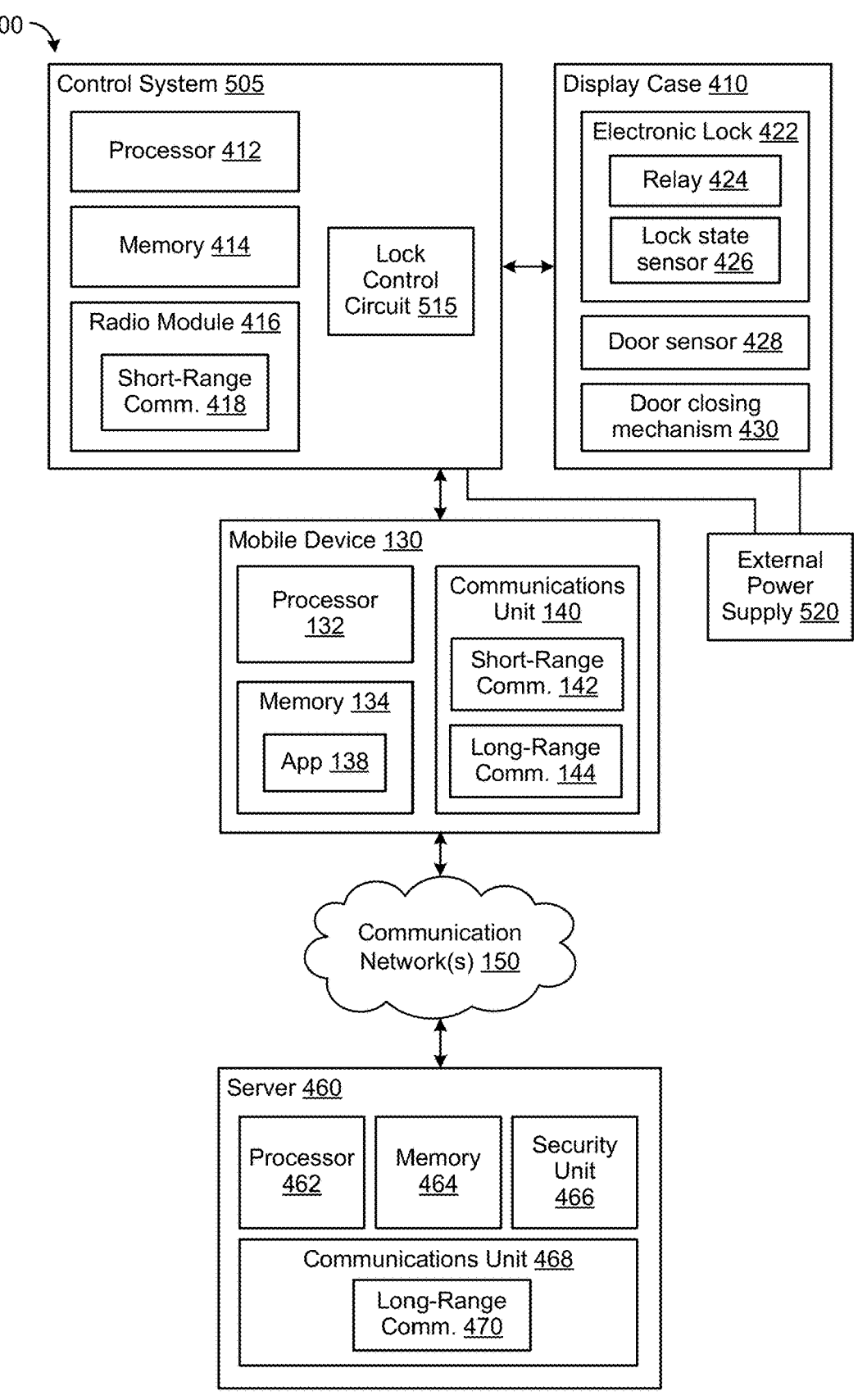
FIG. 5 is a block diagram of a display case security system including a display case control system in accordance with some implementations.

FIG. 5 illustrates a block diagram of a display case security system 500 including a display case control system 505 configured to communicate with a display case 410 and a mobile device 130, and a server 460 in accordance with some implementations.

Systems 400 (FIG. 4) and 500 (FIG. 5) are similar, except the display case control system 505 and the power supply 520 are independent modules. In some implementations, the control system 505 is a "kit" that is installed on or inside of a display case 410 (e.g., in order to retrofit an offline display case). For example, the display case 410 can be a standard piece of furniture that is commercially available and/or already exists in a retail store. In some implementations, the control system 505 and the display case 410 are connected to an external power supply 520. In some implementations, the lock control circuit 515 is configured to control the state of the electronic lock 422. Specifically, rather than the processor 412 directly controlling the electronic lock 422 as in system 400 (FIG. 4), the processor 412 sends instructions to the lock control circuit 515, which transmits those instructions to the electronic lock 422 via an adapter assembly. In some implementations, the radio module 416, the processor(s) 412, the memory 414, and the lock control circuit 515 are all part of an SOC implementation (e.g., an all-in-one unit).

Figure 11:
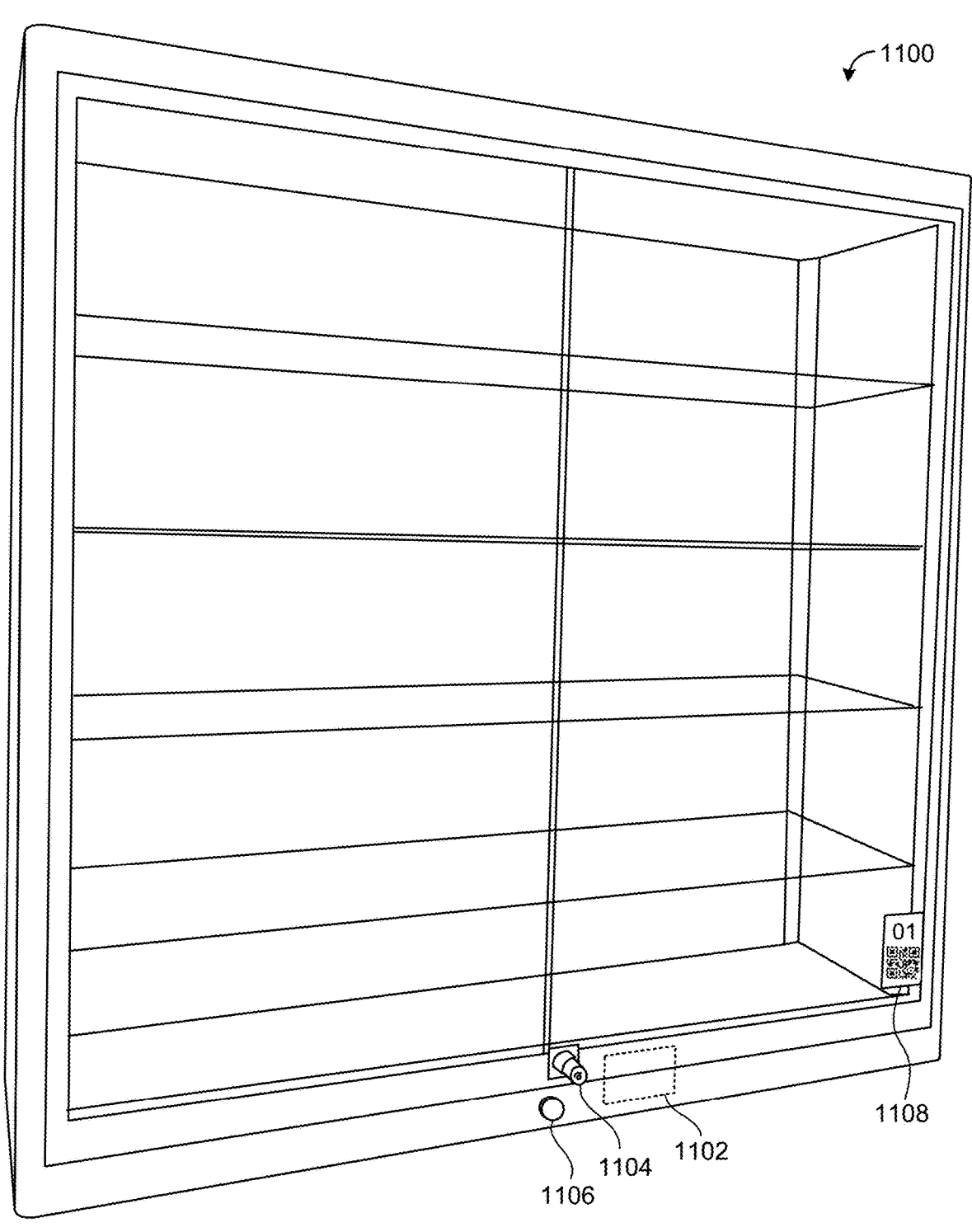
FIG. 11 illustrates an offline retail display case in accordance with some implementations.

FIG. 11 illustrates an offline retail display case 1100 in accordance with some implementations. In some implementations, the offline retail display case 1100 corresponds to display case 410 and includes internal electronics 1102 comprising the processor 412, memory 414, and radio module 416 as described above with reference to system 400 (e.g., implemented separately or as an SOC). In some implementations, the offline retail display case 1100 corresponds to display case 410 and includes internal electronics 1102 comprising the processor 412, memory 414, radio module 416, and lock control circuit 515 as described above with reference to system 500 (e.g., implemented separately or as an SOC).

The display case 1100 includes a lock 1104 corresponding to or communicatively coupled to an electronic locking mechanism (e.g., electronic lock 422 described above). In some implementations, the lock 1104 is the electronic lock 422. In some implementations, the display case 1100 includes a door sensor (e.g., 428) and a door closing mechanism (e.g., 430) (not shown in the figure). In some implementations, the display case 1100 includes an indicator 1106 (e.g., an LED) that indicates the lock status of the display case (e.g., red when locked and green when unlocked). In some implementations, the display case 1100 includes an identifier 1108 (e.g., a scannable barcode or QR code) that identifies the display case 1100, or more specifically, the electronics 1102, to the mobile device 130 and/or the server 460.

Figure 6:
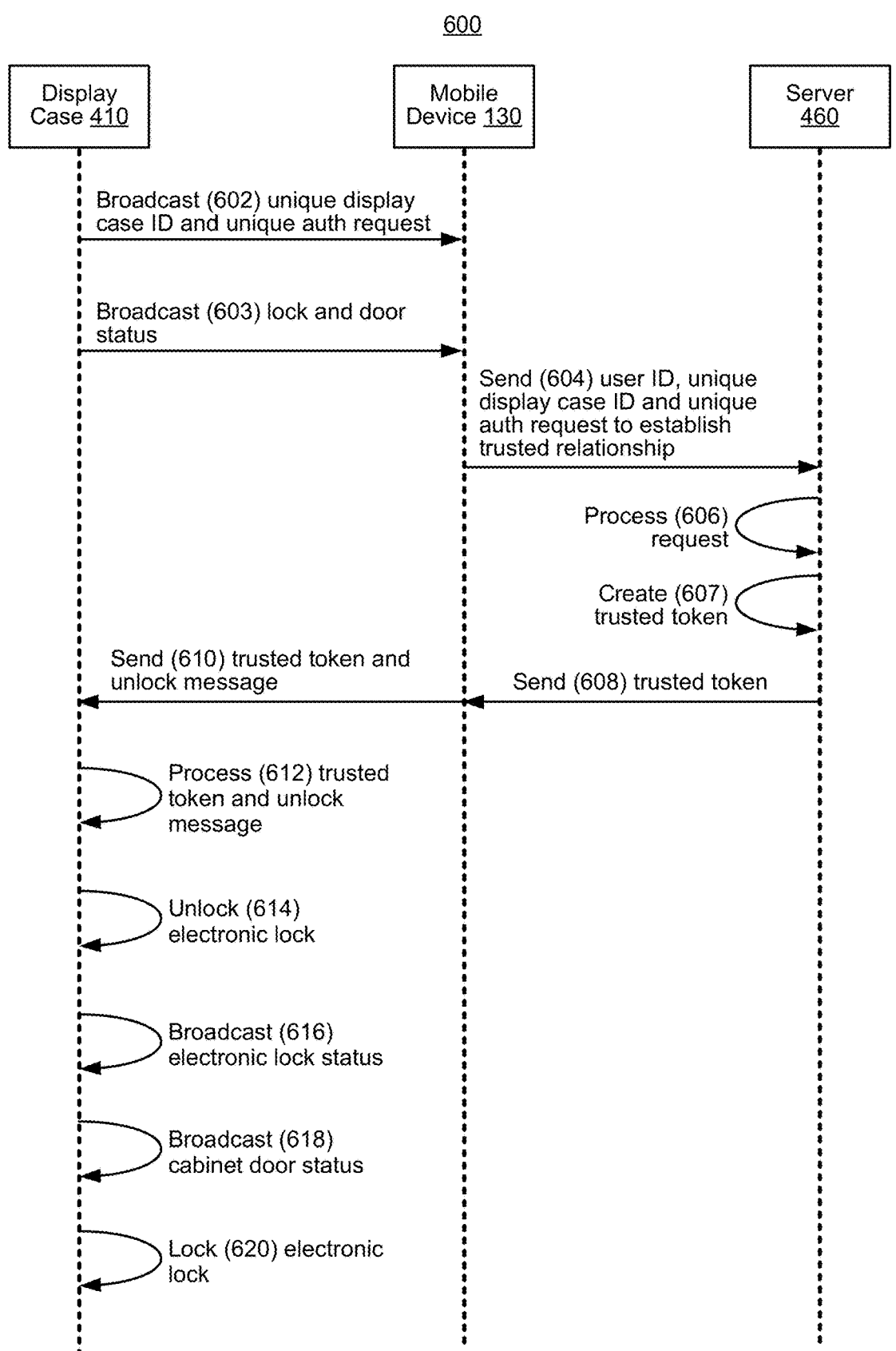
FIG. 6 is a schematic flow diagram of a process for unlocking a display case in accordance with some implementations.

FIG. 6 is a schematic flow diagram of a process 600 for unlocking a display case 410 in accordance with some implementations. In some implementations, the process 600 executes at a display case 410 that is displayed at a retail store or in another environment in which products or goods are displayed and provided to end users, a mobile device 130 (e.g., associated with a consumer or other end user and each executing the application 138 thereon), and a server 460 that is managed by a retailer of the retail store. The server 460 includes the components and functionalities of the validation server 160, and/or the activation server 180. It should be apparent to one of ordinary skill in the art that the steps of the process described with respect to the display case 410 as implemented in system 400 (FIG. 4) are also applicable to the display case 410 as implemented in system 500 (FIG. 5).

The display case 410 broadcasts (602) a unique display case identifier and a unique authorization request (e.g., via radio module 416 using short-range communication capability 418).

In some implementations, the display case 410 broadcasts (603) a status of a lock (e.g., electronic lock 422) and a status of a door of the display case 410.

The mobile device 130 executing the application 138 receives the unique display case identifier and unique auth request via short range communication capability 142. The mobile device 130 sends (604), via the long-range communication capability 144, a request to the server 460 to establish a trusted relationship between a user account of the application and the server 460. The request includes the unique display case identifier, the unique authorization request, and a user identifier corresponding to the user account of the application.

The server 460 processes (606) the request. In some implementations, the server 460 determines, based on the user identifier corresponding to the user account of the application, whether the user identifier belongs to a user (e.g., a customer or a potential customer) that has a trusted relationship with the retailer of the server 460. In general, different retailers can have different parameters for establishing trusted relationships (e.g., accounts) with a customer or a potential customer. Exemplary parameters for establishing trust relationships include, and are not limited to, a customer having payment credentials with the retailer (e.g., a stored credit card or prepayment on file), a customer setting up a loyalty account with the retailer (e.g., the customer downloads an app of the retailer and registers an account), or a customer verifying their identity with the retailer (e.g., the customer sends a scanned copy of their ID to the retailer).

In some implementations, when the server 460 determines that the user identifier belongs to a user that has a trusted relationship with the retailer, the server 460 creates (607) a trusted token. For example, the trusted token can be an encrypted auth grant that includes the unique display case identifier and the unique authorization request). The server 460 sends (608) the trusted token to the mobile device 130 via long-range communication capability. The mobile device 130 sends (610) the trusted token and an unlock message to the display case 410 via short range communication capability 142.

The display case 410 (e.g., the radio module 410) processes (612) the trusted token and the unlock message.

When the display case 410 determines that the trusted token (and the unlock message) is valid, the display case 410 unlocks (614) the electronic lock 424. This enables the user of the mobile device 130 to retrieve the item(s) they would like to purchase from the display case 410 and pay for the item(s) at checkout.

In some implementations, the display case 410 is configured to broadcast (616) a state of the electronic lock 422 (e.g., whether the electronic lock is in its status (open or close) via the short-range communication capability 418 of the radio module 416.

In some implementations, the display case 410 is configured to broadcast (618) a status of a door of the display case 410 (e.g., open or close) that is detected by the door sensor 428 via the short-range communication capability 418 of the radio module 416.

For example, in some instances, the radio module 416 may determine, based on signals received from the door sensor 428 and the lock state sensor 426, that the display case door is open and the electronic lock is in the locked state. In this example, the radio module 416 can send a notification via short-range communication capability 418 to a mobile device associated with a store assistant, who can then check the display case 410 and/or close the door and set the electronic lock 420 to the locked state.

In some implementations, the unlocking of the electronic lock 424 triggers a timer that automatically locks (620) the electronic lock 424 after a predefined time period (e.g., 30 seconds, one minute, or two minutes) has elapsed.

In some implementations, the display case 410 is communicatively connected with a security camera system via short-range communication capability 418. In some implementations, the security camera system is configured to trigger recording of the display case 410 when the electronic lock is in an unlocked state.

Figure 7B:
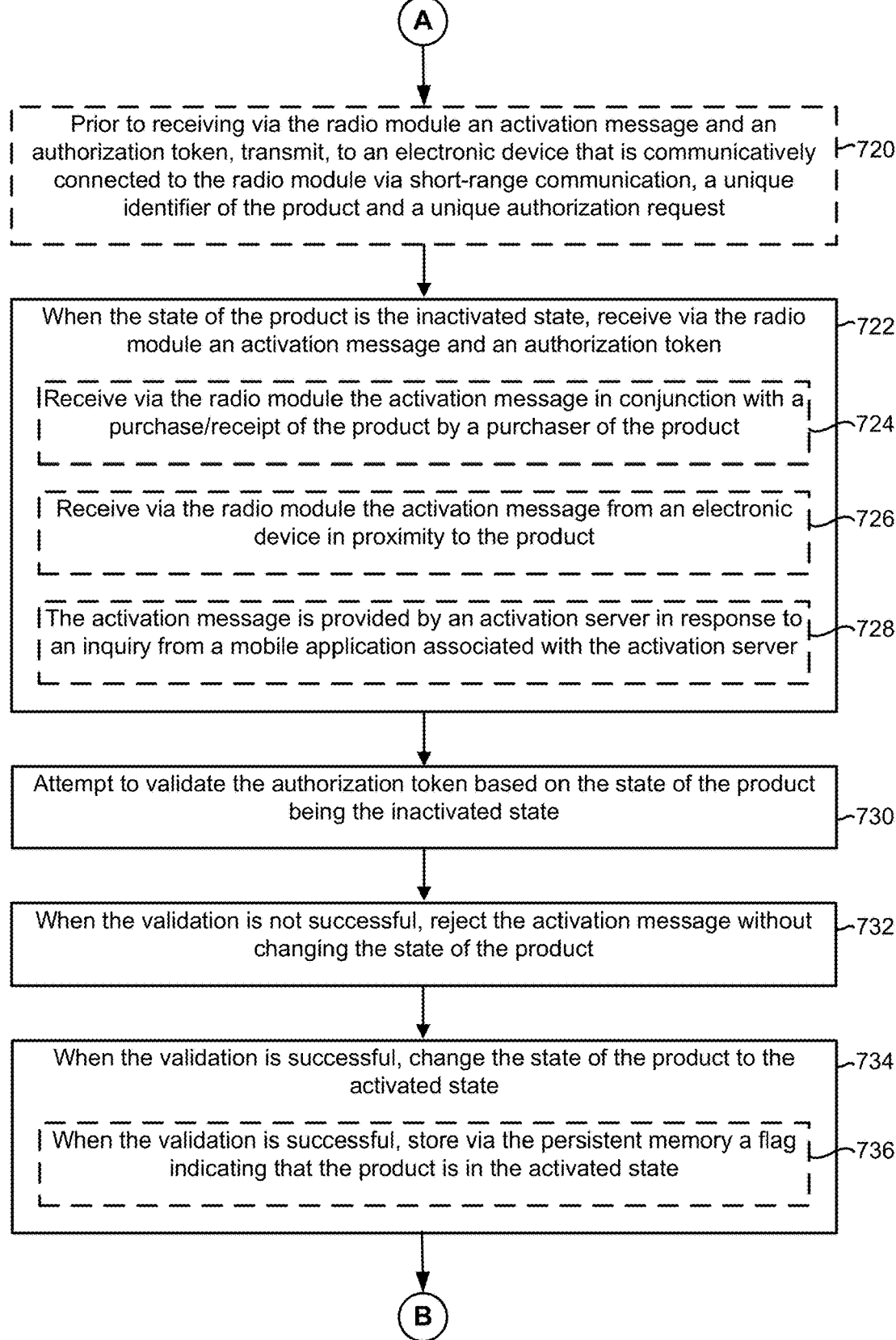

FIGS. 7A-7C illustrate a flowchart diagram of method 700 for activating a product (e.g., product 110) (e.g., an offline product) in accordance with some implementations. The product includes (702) a power supply (e.g., power supply 120), a controller (e.g., controller 122), a persistent memory (e.g., persistent memory 115), and a radio module (e.g., radio module 116). In some implementations, the product has short-range communication capability (e.g., short-range communication capability 118) via the radio module and does not have long-range communication capability. In some implementations, the product has both short- and long-range communication capabilities, but does not require the long-range communication capability for the product activation processes disclosed herein.

The power supply 120 provides (704) power to the product without the product being connected to an external power supply. For example, the power supply can be a battery pack (e.g., a swappable battery pack for a cordless power tool) or an internal power supply or an internal battery that is capable of providing power to the product without the product being connected to an external power supply.

The controller 122 is configured to control (706) operation of the product, including setting a state (e.g., a current state) of the product to any of a plurality of states. In some implementations, the controller is powered by the power supply. The plurality of states includes an inactivated state in which one or more functions of the product are inoperable, and an activated state in which the one or more functions of the product are operable.

In one example, the product is a power tool. The functions of the power tool can include drilling cutting, shaping, grinding, and/or polishing. In another example, the product is an air fryer. The functions of the air fryer can include broiling, roasting, dehydrating, and reheating. In some implementations, the functions of the product are also referred to as product features or product capabilities. In some implementations, a product can include optional features and/or expansion features. In some implementations, the optional features and/or expansion features can be activated in accordance with the processes disclosed herein.

In accordance with some implementations disclosed herein, "activating" a product associates the product (or causes the product to be associated) with a user account of the application 136, or a user account of an application associated with the product manufacturer, or a user account of an application associated with the retail store where the product is purchased. An inactivated product is one that is not associated with any user account.

In some implementations, a product that is stocked in the retail store is in an inactivated state and can be activated (e.g., via the processes described in FIGS. 2 and 3A-3B). In some implementations, an activated product can be deactivated. A deactivated product is one that is not associated with any user account and can be (re)-activated. In some implementations, re-activating a product causes the product to be re-associated with the same usual account as that of the initial (or previous) product activation. In some implementations, re-activating a product causes the product to be re-associated with a different user account from that of the initial (or previous) product activation.

In some implementations disclosed herein, an owner of an activated product can deactivate the product (i.e., dissociate the product from their user account) and transfer ownership of the product to a new owner. The new owner can then activate the product, thereby causing the product to be associated with the new owner's user account.

In some implementations, the plurality of states includes a locked state and an unlocked state. A product that is in a locked state is an activated device that is locked for use, but only the authorized user can unlock it (or cause the device to change from the locked state to the unlocked state.

With continued reference to FIG. 7A, the persistent memory 115 is coupled to the controller 122. The persistent memory 115 stores the state (e.g., a current state) for the product. According to the implementations disclosed herein, the persistent memory 115 retains stored information in absence of power being provided by the power supply 120.

The radio module 116 is (712) configured to receive and transmit short-range wireless messages without use of wide area network communications. For example, the short-range wireless messages are Bluetooth messages. The short-range wireless messages are not internet messages. The wide area networking communications include the internet. In some implementations, the radio module is powered by the power supply. In some implementations, the radio module comprises a low power radio to prevent it from draining the power supply.

In some implementations, the radio module 116 is (714) configured to broadcast the state of the product 110.

In some implementations, the product 110 is (716) provided in a retail environment (e.g., retail setting) (e.g., for sale) in the inactivated state.

In some implementations, the product is (718) one of: a tool, a toy, or an offline electronic device. In some implementations, the product does not have any long-range communication capability (i.e., is not capable of connecting to the internet). In some implementations, the product has long-range communication capability and does not require this capability to perform any of the product activation processes disclosed herein.

Referring to FIG. 7B, in some implementations, prior to receiving via the radio module the activation message and the authorization token, the controller 122 is (720) configured to transmit, to an electronic device (e.g., mobile device 130) that is communicatively connected to the radio module via short-range communication, a unique identifier (e.g., serial number) of the product and a unique authorization request (auth request). See, e.g., FIG. 2 at step 206.

When the state of the product is (722) the inactivated state, the product receives via the radio module an activation message and an authorization token. See, e.g., FIG. 2 at steps 222 and 224.

In some implementations, the product 110 receives (724) via the radio module 116 the activation message in conjunction with a purchase/receipt of the product by a consumer (e.g., buyer, purchaser, user) of the product.

In some implementations, the product 110 receives (726) via the radio module 116 the activation message from an electronic device via short-range communication. The electronic device is located in proximity to (e.g., within a Bluetooth range of) the product. See, e.g., FIG. 2 at step 224.

In some implementations, the activation message is (728) provided by an activation server (e.g., activation server 180) in response to an inquiry from a mobile application associated with the activation server. See, e.g., FIG. 2 at steps 216, 218, and 220.

The product 110 (e.g., the controller 122) attempts (730) to validate the authorization token based on the state of the product being the inactivated state.

When the validation is not successful, the controller 122 rejects (732) the activation message without changing the state of the product.

When the validation is successful, the controller 122 changes (734) the state of the product to the activated state. In some implementations, the controller 122 causes the radio module 116 to transmit an activation success message. The activated product is associated with (e.g., bound to, registered to) the user account of the mobile application that transmits the activation message and the authorization token (se, e.g., FIG. 2 at step 221).

In some implementations, when the validation is successful, the persistent memory 115 stores (736) a flag indicating that the product is in the activated state (e.g., so that the activation process need not happen again when the registered user uses the product).

Referring to FIG. 7C, in some implementations, after changing the state of the product to the activated state, and in response to a short-range wireless message received by the radio module from the electronic device, the controller sets (738) (e.g., changes) the state of the product to: a deactivated state, a locked state, and/or an unlocked state.

In some implementations, the state of the product is (740) set by the controller to the unlocked state. The controller is further configured to change the state of the product from the unlocked state to the locked state after a predefined time duration.

In some implementations, the state of the product is (742) set by the controller to the unlocked state. The controller is further configured to change the state of the product from the unlocked state to the locked state after the product has been used for a predefined number of times.

Even though even though the product activation process that is described in FIGS. 7A to 7C discuss binding of the product to one user account, it will be apparent to one of ordinary skill in the art that in some implementations, the same product can be associated with (e.g., bound to or registered to) many user accounts at the same time. This scenario can occur, for example, in a job site setting where the same product can be used by multiple authorized users.

It should be understood that the particular order in which the operations in FIGS. 7A to 7C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to the method 700 described above with respect to FIGS. 7A to 7C.

Figure 8B:
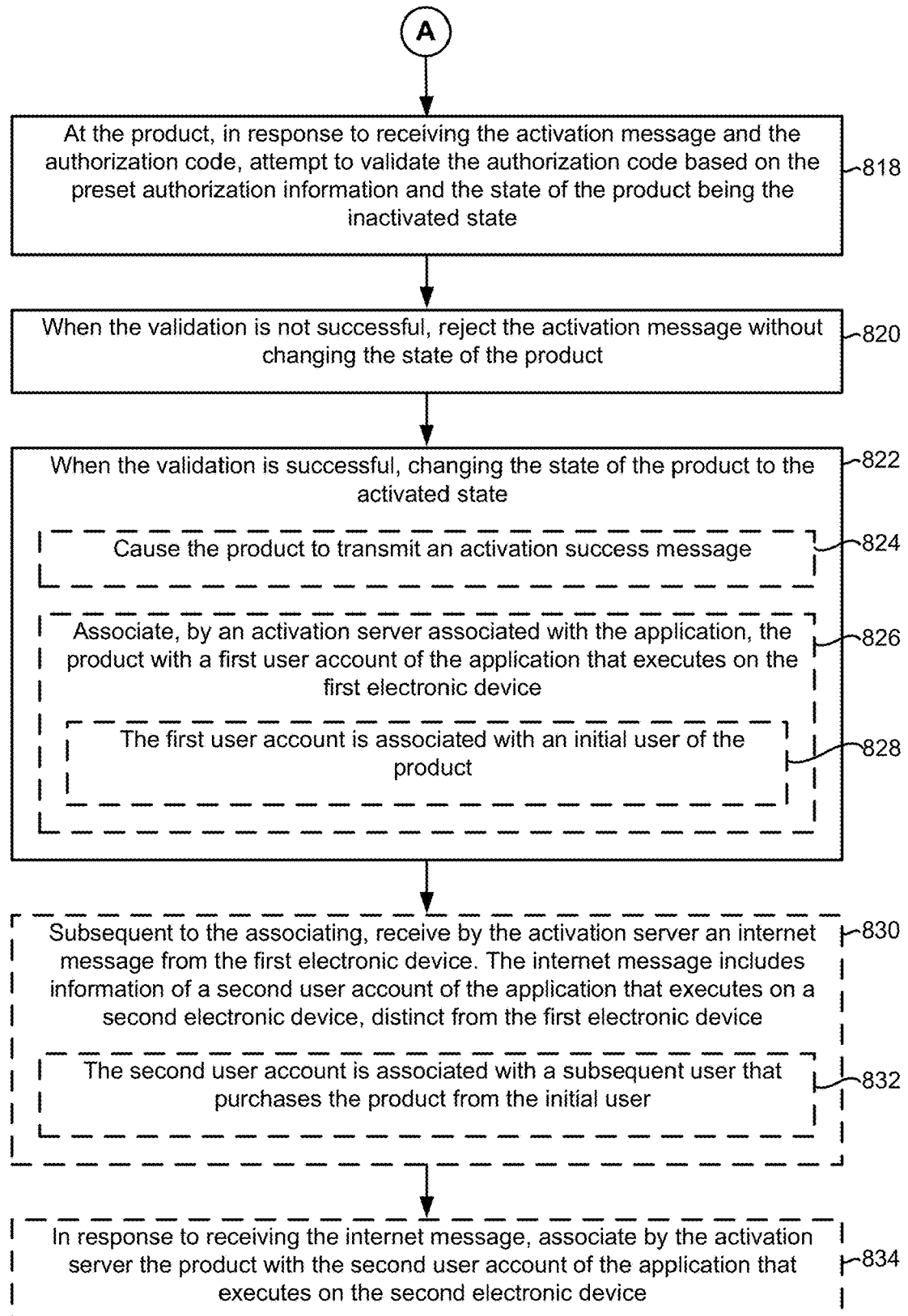

FIGS. 8A-8B illustrate a flowchart diagram of method 800 for activating a product (e.g., an offline product) (e.g., product 110), in accordance with some implementations. Additional details of the method 800 can be found in FIGS. 1 to 7C and the accompanying descriptions, and are not repeated for the sake of brevity.

The method includes associating (802) the product with preset authorization information and storing the preset authorization information in a persistent memory (e.g., persistent memory 115) of the product.

In some implementations, the product includes (804) one or more radios (e.g., radio module 116) for receiving and transmitting short-range wireless messages.

The method includes distributing (806) the product for sale with a state of the product set to an inactivated state. The state of the product is selected from one or more states, including the inactivated state in which one or more functions of the product are inoperable; and an activated state in which the one or more functions of the product are operable. The state is stored in the persistent memory 115 of the product.

The method includes, in conjunction with an authorized sale of the product to a consumer (e.g., a purchaser, a buyer, or a user), providing (808) to an application that executes on a first electronic device of the consumer an authorization code for the product. In some implementations, the authorization code for the product is transmitted from a validation and/or activation server (e.g., validation server 160 or activation server 180).

In some implementations, the authorization code is (810) provided to the electronic device by an internet message transmitted by an authorization server (via long-range communication).

The method includes, in conjunction with an indication by the application that the consumer desires to activate the product, transmitting (812) to the product by the application an activation message and the authorization code.

In some implementations, the activation message and the authorization code are (814) transmitted to the product via messages transmitted by a radio (e.g., communications unit 140) of the electronic device using short-range communication.

In some implementations, the activation message is (816) provided by an activation server (e.g., activation server 180)) associated with the application. The activation server and the first electronic device are communicatively connected via long-range communication.

Referring to FIG. 8B, the method 800 includes, at the offline product, in response to receiving the activation message and the authorization code, attempting (818) to validate the activation code based on the preset authorization information and the state of the product being the inactivated state.

The method includes, when the validation is not successful, rejecting (820) the activation message without changing the state of the product, and The method includes, when the validation is successful, changing (822), by the product (e.g., automatically and without user intervention), the state of the product to the activated state. In some implementations, the method includes causing (824) the product to transmit an activation success message.

In some implementations, changing the state of the product to the activated state includes associating (826) (e.g., binding, establishing a binding relationship, causing the product to be registered), by an activation server associated with the application, the product with a first user account of the application that executes on the first electronic device. For example, the activation server associates the unique identifier (e.g., serial number) of the product with the first user account.

In some implementations, the first user account is (828) associated with an initial user of the product.

In some implementations, the method includes, subsequent to the associating, receiving (830) by the activation server an internet message from the first electronic device. The internet message includes information of a second user account of the application that executes on a second electronic device, distinct from the first electronic device.

In some implementations, the second user account is (832) associated with a subsequent user that purchases the product from the initial user.

In some implementations, the method includes, in response to receiving the internet message, associating (834) by the activation server the product with the second user account of the application that executes on the second electronic device.

Figure 9B:
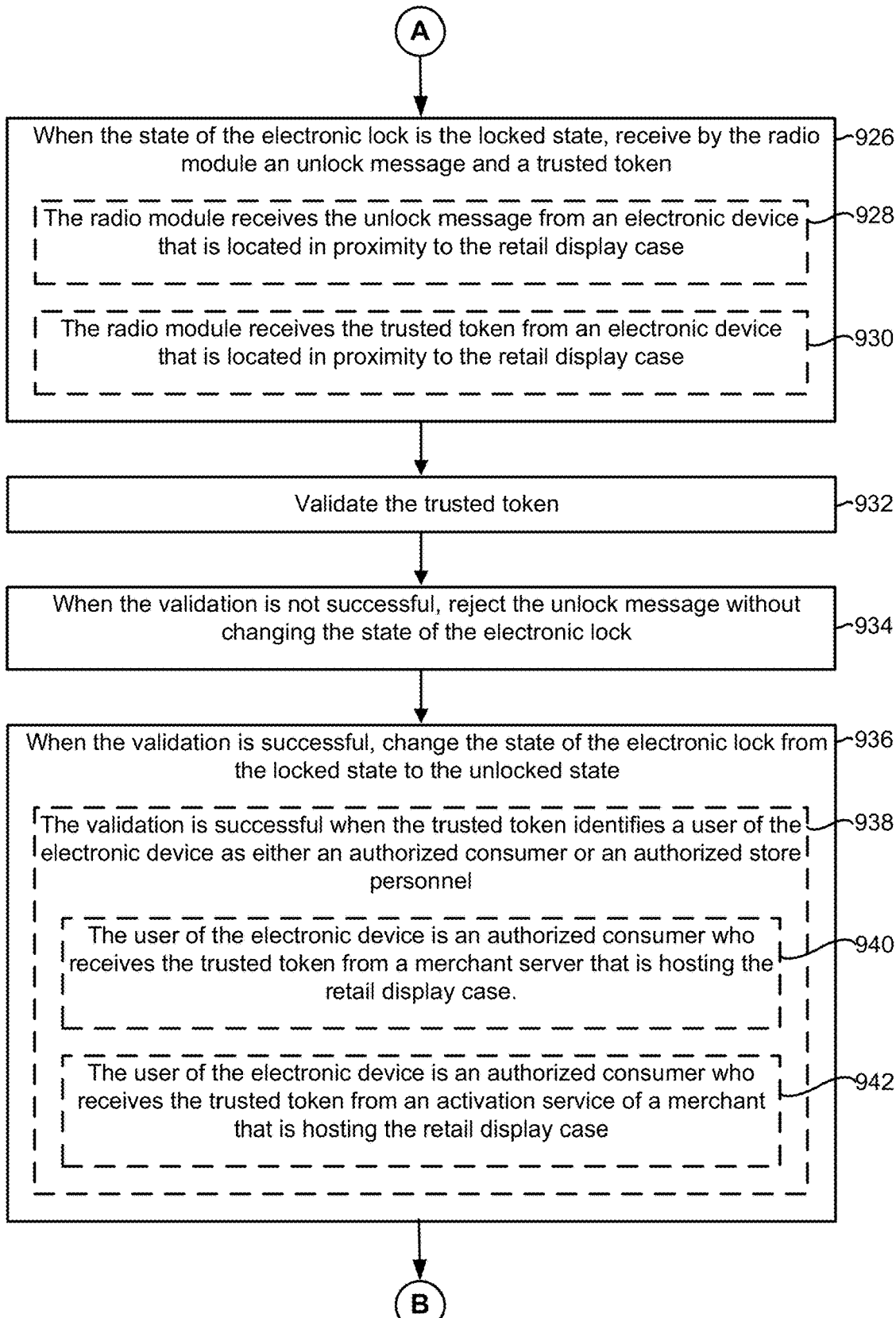

FIGS. 9A-9C illustrate a flowchart diagram of a method 900 for unlocking an offline retail display case (e.g., as implemented in system 400 and/or system 500) that stocks physical products, in accordance with some implementations. Additional details of the method 900 can be found in FIGS. 1 to 8B and the accompanying descriptions, and are not repeated for the sake of brevity.

The retail display case includes (902) a power supply (e.g., power supply 420 or external power supply 520), an electronic lock (e.g., electronic lock 422), and a radio module (e.g., radio module 416).

The power supply provides (804) power to the retail display case.

In some implementations, the power supply is (906) a wired power supply (e.g., a corded power supply that is connected to an electrical outlet).

In some implementations, the power supply is (908) a battery.

The electronic lock comprises (910) a state (e.g., a current state). The state is selected from one or more states including: a locked state, in which access to the physical products is prevented; and an unlocked state, in which access to the physical products is enabled.

In some implementations, the electronic lock is (912) selected from the group consisting of: a magnetic lock, an electromagnetic lock, a Bluetooth electronic lock, and a solenoid lock, and an electromechanical lock. For example, the electronic lock can be any electronic lock that is available off-the-shelf.

In some implementations, the retail display case comprises (814) a relay (e.g., relay 424) (e.g., an electrically operated switch) that is connected (e.g., electrically) to the electronic lock.

The radio module (e.g., a short-range transceiver) is (916) configured to receive and transmit short-range wireless messages without use of wide area network communications and to control the state of the electronic lock via a control signal output by the radio module. For example, the short-range wireless messages are Bluetooth messages; they are not internet messages. In some implementations, the radio module is a low power radio to prevent it from draining the power supply. In some implementations, the wide area networking communications include the internet.

In some implementations, the radio module includes (918) a processor (e.g., processor 412) and memory (e.g., memory 414).

In some implementations, the radio module is (920) configured to broadcast (e.g., periodically, over time, from time to time) short-range wireless messages specifying the state of the electronic lock. See, e.g., FIG. 6 at step 616.

In some implementations, the radio module is (922) configured to broadcast a unique identifier of the retail display case. See, e.g., FIG. 6 at step 602.

Referring to FIG. 9B, in some implementations, the method 900 includes, when the state of the electronic lock is the locked state, receiving (926) by the radio module of the display case an unlock message and a trusted token. See, e.g., FIG. 6 at step 610.

In some implementations, the radio module receives (928) the unlock message from an electronic device (from an application executing on the electronic device) (via a first transceiver of the electronic device with a short-range communication capability) that is located in proximity to the retail display case.

In some implementations, the radio module receives (930) the trusted token from an electronic device that is located in proximity to the retail display case.

The radio module validates (932) the trusted token.

When (e.g., in accordance with a determination by a processor of the radio module) the validation is not successful, the radio module rejects (934) the unlock message without changing the current state of the electronic lock, and When the validation is successful, the radio module changes (936) the state of the electronic lock from the locked state to the unlocked state.

In some implementations, the validation is successful when the trusted token identifies (938) a user of the electronic device as either an authorized consumer or an authorized store personnel. For example, in some implementations, the user of the electronic device is deemed (e.g., by a server of the retailer that houses the retail display case) when have a loyalty account with the retailer, or status/relationship with the retailer, or payment credentials (e.g., stored credit card or prepayment on file), or when they verify their identity (e.g., by transmitting to a server of the retailer a copy of their ID).

In some implementations, the user of the electronic device is (940) an authorized consumer who receives the trusted token from a merchant (or a retail store) that is hosting the retail display case.

In some implementations, the user of the electronic device is (942) an authorized consumer who receives the trusted token from an activation service of a merchant that is hosting the retail display case.

With continued reference to FIG. 9C, in some implementations, the radio module, after changing the current state of the electronic lock to the unlocked state, changes (944) (e.g., automatically, without user intervention) the current state of the electronic lock from the unlocked state to the locked state after a predefined time duration (e.g., X seconds, Y minutes, or a predefined time duration that is specified by the retailer).

In some implementations, the radio module transmits (946) a short-range wireless message to a camera (e.g., a security camera) in proximity to the retail display case when (whenever) the current state of the electronic lock changes from the locked state to the unlocked state.

In some implementations, the retail display case includes a door sensor (e.g., door sensor 428) coupled to a door of the retail display case. The radio module is configured to broadcast (948) short-range wireless messages specifying a state of the door, wherein the state of the door comprises a door open state and a door close state. See, e.g., FIG. 6 at step 620.

Figure 10:
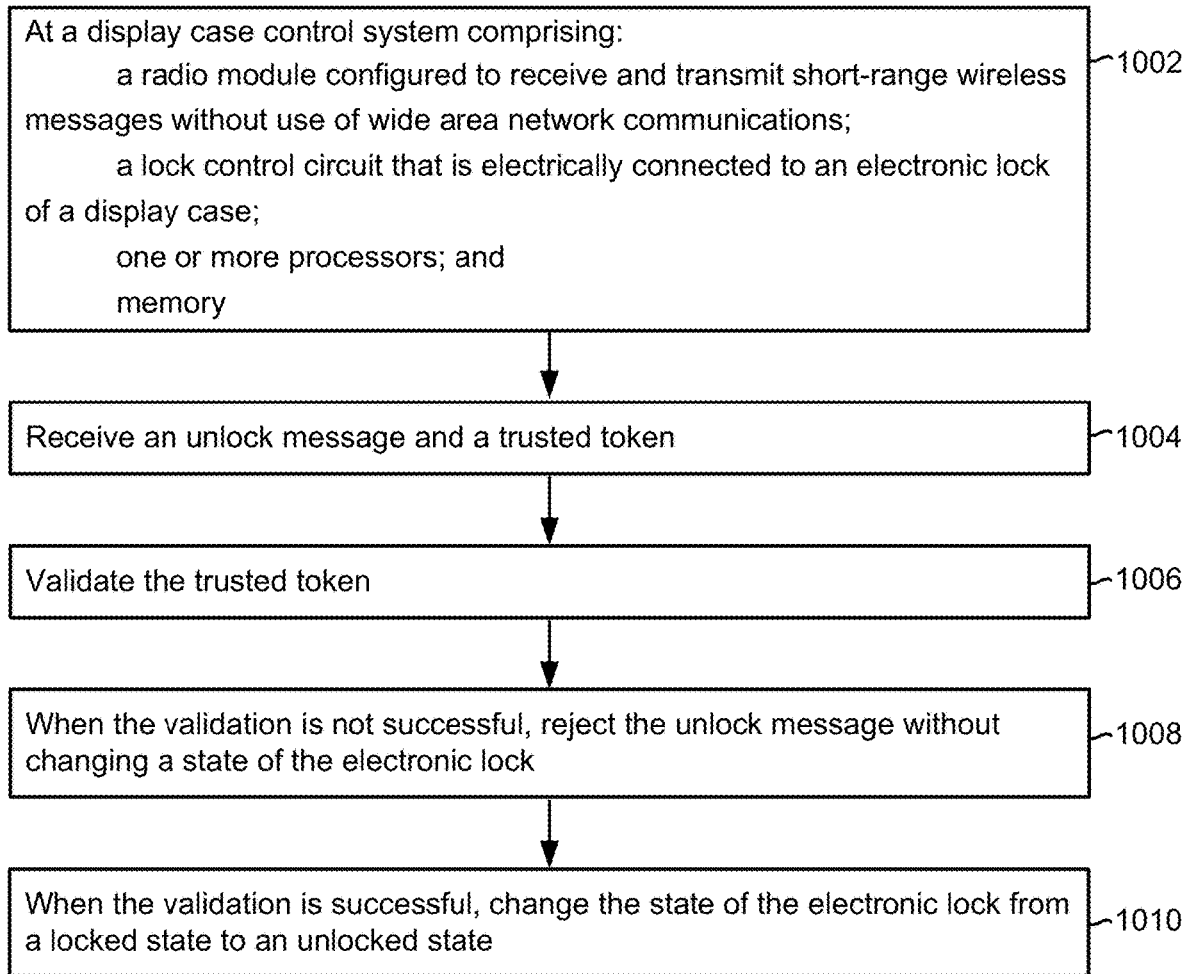
FIG. 10 illustrates a flowchart diagram of method for unlocking an offline retail display case that stocks physical products, in accordance with some implementations.

FIG. 10 illustrates a flowchart diagram of a method 1000 for unlocking an offline retail display case (e.g., display case 410) that stocks physical products, in accordance with some implementations. Additional details of the method 900 can be found in FIGS. 1 to 9C and the accompanying descriptions, and are not repeated for the sake of brevity.

The method 1000 is performed (1002) at a display case control system (e.g., display case control system 505) comprising a radio module (e.g., radio module 416) configured to receive and transmit short-range wireless messages without use of wide area network communications (e.g., using short-range communication capability 418), a lock control circuit (e.g., lock control circuit 515) that is electrically coupled to an electronic lock (e.g., electronic lock) of the offline display case 410, one or more processors (e.g., processor 412), and memory (e.g., memory 414). The electronic lock includes a state (e.g., a current state) that is either a locked state or an unlocked state.

The display case control system receives (1004) via the radio module an unlock message and a trusted token.

The display case control system validates (1006) the trusted token.

When the validation is not successful, the display case control system rejects (1008) the unlock message without changing the state of the electronic lock.

When the validation is successful, the display case control system changes (1010) the state of the electronic lock (e.g., from the locked state to the unlocked state).

Note that the various implementations described above can be combined with any other implementations described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

It should be noted that relative terms are meant to help in the understanding of the technology and are not meant to limit the scope of the invention. Similarly, unless specifically stated otherwise, the terms used for labels (e.g., "first," "second," and "third") are meant solely for purposes of designation and not for order or limitation. The term "short" in the phrase "short-range" (in addition to having technology specific meanings) is relative to the term "long" in the phrase "long-range."

The terms "may," "might," "can," and "could" are used to indicate alternatives and optional features and only should be construed as a limitation if specifically included in the claims.

It should be noted that, unless otherwise specified, the term "or" is used in its nonexclusive form (e.g., "A or B" includes A, B, A and B, or any combination thereof, but it would not have to include all of these possibilities). It should be noted that, unless otherwise specified, "and/or" is used similarly (e.g., "A and/or B" includes A, B, A and B, or any combination thereof, but it would not have to include all of these possibilities). It should be noted that, unless otherwise specified, the terms "includes" and "has" mean "comprises" (e.g., a device that includes, has, or comprises A and B contains A and B, but optionally may contain C or additional components other than A and B). It should be noted that, unless otherwise specified, the singular forms "a," "an," and "the" refer to one or more than one, unless the context clearly dictates otherwise.

It is to be understood that the inventions, examples, and implementations described herein are not limited to particularly exemplified materials, methods, and/or structures. It is to be understood that the inventions, examples, and implementations described herein are to be considered preferred inventions, examples, and implementations whether specifically identified as such or not.

The terms and expressions that have been employed in the foregoing specification are used as terms of description and not of limitation, and are not intended to exclude equivalents of the features shown and described. While the above is a complete description of selected implementations of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A retail display case that stocks physical products, comprising:
   a power supply that provides power to the retail display case;
   an electronic lock with a state, wherein the state is selected from one or more states including:
      a locked state, in which access to the physical products is prevented; and
      an unlocked state, in which access to the physical products is enabled;
   a radio module configured to broadcast short-range wireless messages including a unique identifier of the retail display case and a unique authorization request without use of wide area network communications, receive short-range wireless messages from one or more mobile devices in proximity to the display case, and control the state of the electronic lock via a control signal output by the radio module;
   wherein, when the state of the electronic lock is the locked state and the retail display case receives by the radio module an unlock message and a trusted token, the radio module is configured to:
      determine whether an authorization grant included in the trusted token is valid, wherein the authorization grant is valid if the authorization grant includes the unique identifier of the retail display case and the unique authorization request;
      when the authorization grant is not valid, reject the unlock message without changing the state of the electronic lock; and
      when the authorization grant is valid, change the state of the electronic lock from the locked state to the unlocked state.

2. The retail display case of claim 1, wherein the radio module is further configured to:
   after changing the state of the electronic lock to the unlocked state:
      change the state of the electronic lock from the unlocked state to the locked state after a predefined time duration.

3. The retail display case of claim 1, wherein the radio module is further configured to broadcast short-range wireless messages specifying the state of the electronic lock.

4. The retail display case of claim 1, wherein the radio module receives the unlock message from an electronic device that is located in proximity to the retail display case.

5. The retail display case of claim 4, wherein the validation is successful when the trusted token identifies a user of the electronic device as either an authorized consumer or an authorized store personnel.

6. The retail display case of claim 5, wherein the user of the electronic device is an authorized consumer who receives the trusted token from a merchant server that is hosting the retail display case.

7. The retail display case of claim 5, wherein the user of the electronic device is an authorized buyer who receives the trusted token from an activation service of a merchant that is hosting the retail display case.

8. The retail display case of claim 1, wherein the radio module is further configured to:
   transmit a short-range wireless message to a camera in proximity to the retail display case when the state of the electronic lock changes from the locked state to the unlocked state.

9. The retail display case of claim 1, wherein the power supply is a wired power supply.

10. The retail display case of claim 1, wherein the power supply is a battery.

11. The retail display case of claim 1, wherein the electronic lock is selected from the group consisting of: a magnetic lock, an electromagnetic lock, a Bluetooth electronic lock, and a solenoid lock, and an electromechanical lock.

12. The retail display case of claim 1, wherein the electronic lock is connected to a relay.

13. The retail display case of claim 1, wherein the radio module is configured to broadcast a unique identifier of the retail display case.

14. The retail display case of claim 1, further comprising:
   a door sensor coupled to a door of the retail display case, wherein the radio module is further configured to broadcast short-range wireless messages specifying a state of the door, wherein the state of the door comprises a door open state and a door close state.

15. The retail display case of claim 1, wherein the radio module includes a processor and memory.

16. A method of unlocking an offline retail display case that stocks physical products, comprising:
   at the offline retail display case that includes a processor, memory, an electronic lock, a relay coupled to the electronic lock, and a radio module configured to (i) broadcast short-range wireless messages including a unique identifier of the retail display case and a unique authorization request without use of wide area network communications, (ii) receive short-range wireless messages from one or more mobile devices in proximity to the display case, and (iii) control a state of the electronic lock via a control signal output by the radio module:
      receiving via the radio module an unlock message and a trusted token;
      determining whether an authorization grant included in the trusted token is valid, wherein the authorization grant is valid if the authorization grant includes the unique identifier of the retail display case and the unique authorization request;
      in accordance with a determination that the authorization grant is not valid, rejecting the unlock message without changing the state of the electronic lock, and
      in accordance with a determination that the authorization grant is valid, changing the state of the electronic lock.

17. A non-transitory computer-readable storage medium storing one or more programs, the one or more programs comprising instructions, which, when executed by one or more processors of a display case control system having a radio module configured to (i) broadcast short-range wireless messages including a unique identifier of the retail display case and a unique authorization request without use of wide area network communications, (ii) receive short-range wireless messages from one or more mobile devices in proximity to the display case, and (iii) control a state of the electronic lock via a control signal output by the radio module; and a lock control circuit that is electrically connected to an electronic lock of a display case, cause the display case control system to:

receive an unlock message and a trusted token;

determining whether an authorization grant included in the trusted token is valid, wherein the authorization grant is valid if the authorization grant includes the unique identifier of the retail display case and the unique authorization request;

when the authorization grant is not valid, reject the unlock message without changing a state of the electronic lock; and when the authorization grant is valid, change the state of the electronic lock.

\* \* \* \* \*